US012620326B2

(12) United States Patent
Ambartsoumian

(10) Patent No.: US 12,620,326 B2
(45) Date of Patent: May 5, 2026

(54) LABEL ASSEMBLY AND METHOD FOR AFFIXING A LABEL TO A SURFACE USING THE SAME

(71) Applicant: Gourgen Ambartsoumian, Québec (CA)

(72) Inventor: Gourgen Ambartsoumian, Québec (CA)

( * ) Notice: Subject to any disclaimer, the term of this patent is extended or adjusted under 35 U.S.C. 154(b) by 529 days.

(21) Appl. No.: 17/092,719

(22) Filed: Nov. 9, 2020

(65) Prior Publication Data

US 2022/0058984 A1 Feb. 24, 2022

Related U.S. Application Data

(60) Provisional application No. 63/069,397, filed on Aug. 24, 2020.

(51) Int. Cl.
*G09F 3/02* (2006.01)
*B65C 3/08* (2006.01)
(Continued)

(52) U.S. Cl.
CPC .................. *G09F 3/02* (2013.01); *B65C 3/08* (2013.01); *B65C 9/0006* (2013.01);
(Continued)

(58) Field of Classification Search
None
See application file for complete search history.

(56) References Cited

U.S. PATENT DOCUMENTS 4,513,522 A * 4/1985 Selenke ................ G09F 3/0288
40/306
5,284,689 A * 2/1994 Laurash .................... G09F 3/10
283/81
(Continued)

FOREIGN PATENT DOCUMENTS

| CN | 103650017 A | 3/2014 |
| CN | 104268614 A | 1/2015 |
| CN | 109712518 A | 5/2019 |
| JP | 2011197135 A | 10/2011 |
| WO | 2009132222 A2 | 10/2009 |

OTHER PUBLICATIONS

First Office Action in Chinese Patent Application No. 202180051999.0 dated May 16, 2025, with machine translation, 56 pages.

*Primary Examiner* — Alicia Chevalier
*Assistant Examiner* — Thomas A Mangohig
(74) *Attorney, Agent, or Firm* — Hahn Loeser & Parks LLP

(57) ABSTRACT

A label assembly and a method for affixing a label to a surface, the label assembly comprising: a label support liner having a label receiving surface comprising a release coating, the label support liner including a main liner portion and a removable liner portion separable from the main liner portion; and a label layer extending over the label receiving surface, the label layer including: a label releasably affixed to the label receiving surface, the label including a first label portion overlapping the main liner portion and a second label portion overlapping the removable liner portion such that separating the removable liner portion from the main liner portion and moving the removable liner portion away from the label receiving surface peels the first label portion away from the main liner portion while the second label portion remains affixed to the removable liner portion.

30 Claims, 31 Drawing Sheets

(51) Int. Cl.

| | | |
|---|---|---|
| *B65C 9/00* | (2006.01) | |
| *B65C 9/18* | (2006.01) | |
| *C09J 7/29* | (2018.01) | |
| *C09J 7/38* | (2018.01) | |
| *C09J 7/40* | (2018.01) | |

(52) U.S. Cl.
CPC ............... *B65C 9/1869* (2013.01); *C09J 7/29* (2018.01); *C09J 7/38* (2018.01); *C09J 7/403* (2018.01); *C09J 2301/18* (2020.08); *C09J 2301/204* (2020.08); *C09J 2301/502* (2020.08); *G09F 2003/0222* (2013.01); *G09F 2003/0226* (2013.01); *G09F 2003/0229* (2013.01); *G09F 2003/0272* (2013.01)

(56) References Cited

U.S. PATENT DOCUMENTS

| | | | |
|---|---|---|---|
| 2010/0129583 A1 * | 5/2010 | Hong ...................... | G09F 13/08 428/41.8 |
| 2010/0233411 A1 | 9/2010 | Flynn et al. | |
| 2010/0233412 A1 * | 9/2010 | Wong ...................... | B65C 9/265 428/43 |
| 2011/0259775 A1 * | 10/2011 | Bratter ................. | G09F 3/0288 206/449 |

\* cited by examiner

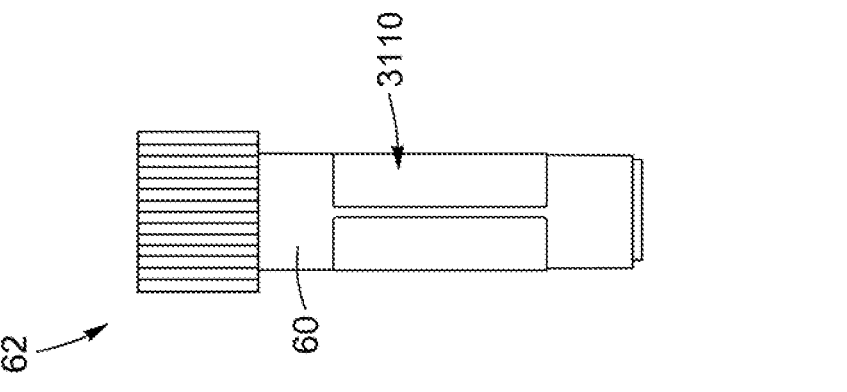
FIG. 33E
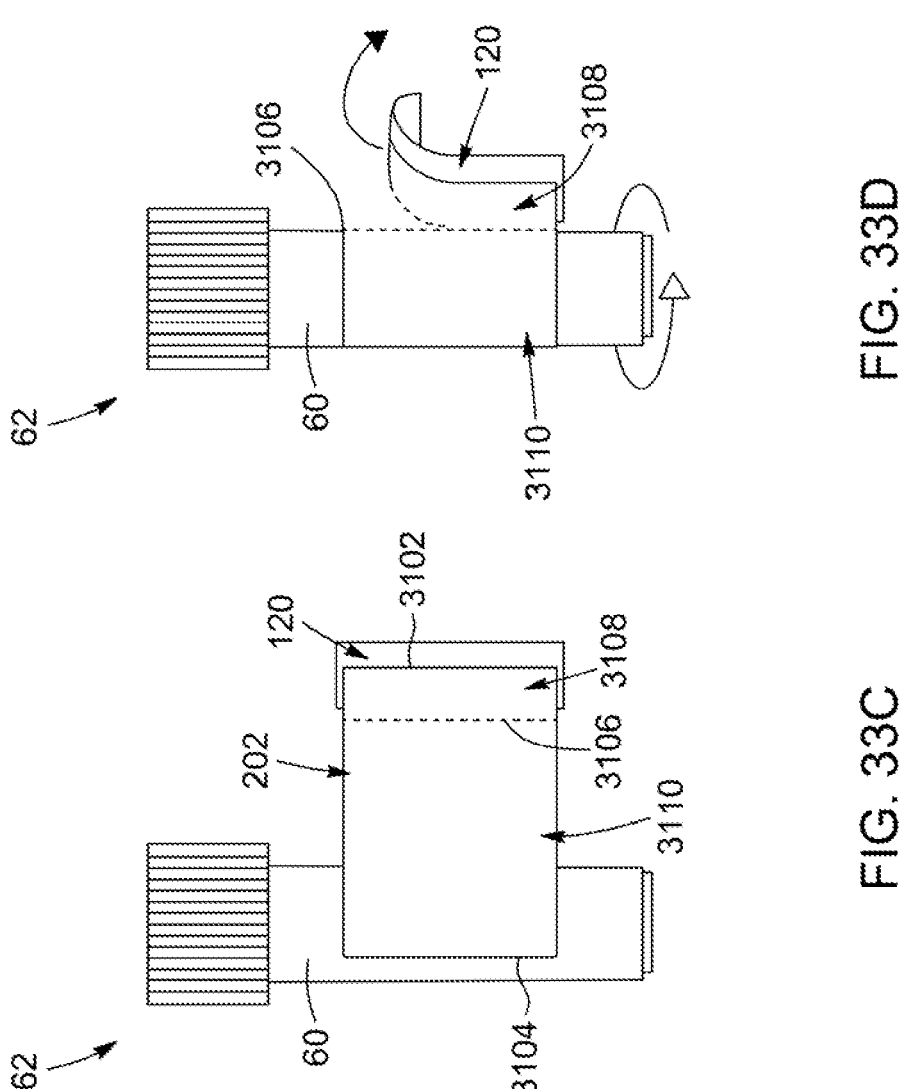
FIG. 33D
FIG. 33C

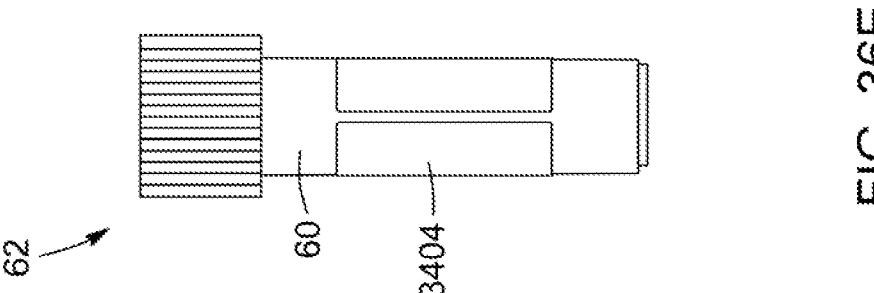
FIG. 36E
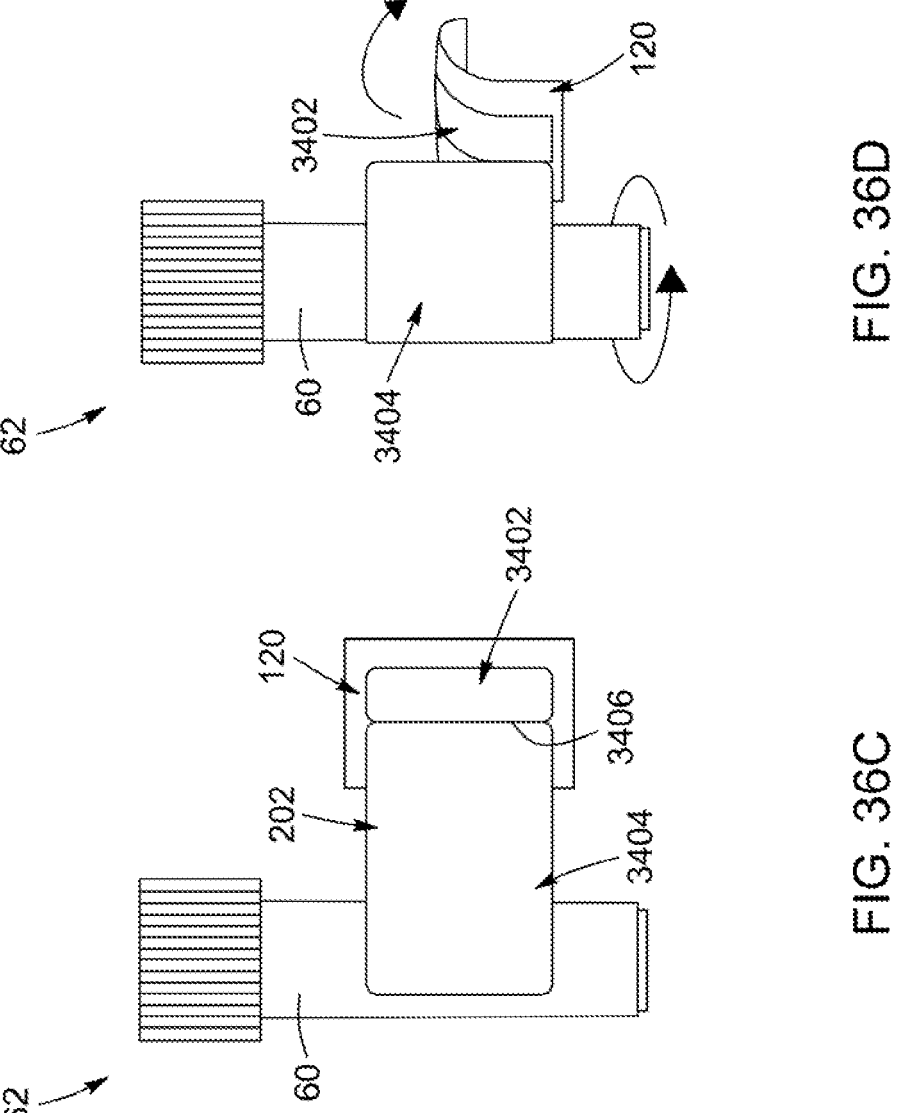
FIG. 36D
FIG. 36C

LABEL ASSEMBLY AND METHOD FOR AFFIXING A LABEL TO A SURFACE USING THE SAME

TECHNICAL FIELD

The technical field generally relates to adhesive labels. More particularly, the technical field relates to label assemblies and to methods for affixing labels to items using label assemblies.

BACKGROUND

Label assemblies usually include a label support liner, as well as one or more label(s) being releasably affixed thereto. Typically, to remove a label from the support liner, a user wedges a fingertip, fingernail or another tool under a corner or edge of the label to lift the corner or edge of the label off from the liner. Some users may instead slide a finger or tool along the liner next to the label towards an edge or corner of the label to catch the edge or corner of the label and thereby try and peel off the edge or corner of the label from the liner. Once a corner or edge of the label has been lifted, the user then grasps the corner or edge of the label lifted from the liner and pulls the corner or edge of the label away from the liner to peel the label off the liner.

Unfortunately, these types of manipulation are time-consuming, inconvenient, and may damage the label, especially the corner or edge of the label which was lifted using a fingernail or tool. For example, it is known that peeling of polymeric thin facestock (0.4 mil-5.0 mil) and flexible labels which in general have higher elongation values either in machine or traverse directions or both, are more difficult. These prior art labels tend to conform to the support liner movement and even with bending is hard to separate the corner or the edge of the label from the support liner. Even after the separation from the support liner and after the peeling, these thin and flexible labels become flimsy and tend to bend and stick to fingers or to itself. This is often due to the fact that film labels have some significant static charges accumulated on their surfaces which, in the absence of the support liner, may cause them to stick to any nearby object including the fingers of the user. Furthermore, at the moment of applying the prior art label to a substrate such as a vial, microscope slide, automobile part, or any other flat or cylindrical or other type of object, it may become difficult to control the positioning of the label due to the fact that adhesive is already stuck to the finger of the user on one side which, combined with static charges, may interfere with controlling the proper positioning of the label on the substrate.

Another technique consists in bending the liner near the edge or corner of the label to try and cause the edge or corner of the label to lift off the liner, or at least to facilitate the wedging of a fingertip, fingernail or tool under the edge or corner of the label. Again, this technique may damage the label. This technique may also require the use of both hands, which may not be possible or practical in some circumstances. For example, if the label is to be used in a medical context to label a container in which a specimen such as a blood sample collected from a patient, the user, in this case a medical professional, may still be attending to the patient and therefore may not have both hands available.

Moreover, peeling off the label from the liner reveals an adhesive underside of the label. The finger of the user grasping the label may therefore come in contact with the adhesive underside of the label. This may cause the label or part of the label to become at least temporarily stuck to the user's fingers, which hinders the process of affixing the label to a desired surface. This may further cause the label to not be properly applied on the surface, which can reduce readability of any inscription on the label, may reduce the adhesion of the label on the surface and/or may create one or more pockets under the label in which contaminants may accumulate. Touching the adhesive may also cause adhesive contamination in the area of contact with the skin and diminish its performance for intended applications such as to resist harsh solvents such as xylene, toluene, industrial thinners, etc., or resist to cryogenic temperatures such as inside dry ice or liquid nitrogen at −196° C., or liquid helium at −269° C., or resist to high temperatures such as at 120° C. or higher (e.g. up to 600° C.) inside steam autoclave or furnace. In cases where labels must be handled with gloves such as in medical or other types of laboratories, or in sterile environments, the labels can stick to gloves and become very difficult or impossible to remove from the glove causing disruptions due to a need to change the gloves in the midst of the procedure which in turn can have undesirable consequences.

SUMMARY

In accordance with one implementation, there is provided a label assembly comprising: a label support liner having a label receiving surface comprising a release coating, the label support liner including a main liner portion and a removable liner portion separable from the main liner portion; and a label layer extending over the label receiving surface, the label layer including: a label releasably affixed to the label receiving surface, the label including a first label portion overlapping the main liner portion and a second label portion overlapping the removable liner portion such that separating the removable liner portion from the main liner portion and moving the removable liner portion away from the label receiving surface peels the first label portion away from the main liner portion while the second label portion remains affixed to the removable liner portion.

In at least one implementation, the label support liner includes a liner side edge and further wherein the removable liner portion is located adjacent the liner side edge.

In at least one implementation, the label is spaced from the liner side edge by a distance of between about 0 mm and 30 mm.

In at least one implementation, the label is spaced from the liner side edge by a distance of between about 1 mm and 5 mm.

In at least one implementation, the liner includes a liner cut line delimiting the removable liner portion, the cut line including a first cut line end located towards the liner side edge and a second cut line located towards the liner side edge and spaced apart from the first cut line end along the liner side edge.

In at least one implementation, the liner cut line intersects the liner side edge at the first and second cut line ends.

In at least one implementation, the cut line includes first and second linear cut line portions extending away from the liner side edge and a third linear cut line portion extending between the first and second linear cut line portions.

In at least one implementation, the first and second cut line portions are substantially parallel to each other.

In at least one implementation, the liner side edge is linear and further wherein the first and second cut line portions are substantially perpendicular to the liner side edge.

In at least one implementation, the third linear cut portion is substantially parallel to the linear side edge.

In at least one implementation, the third linear cut portion is spaced from the linear side edge by a distance of between about 0.06 inch and 4.3 inches. More specifically, the third linear cut portion could be spaced from the linear side edge by a distance of between about 0.06 inch and 0.5 inch, or by a distance of between about 0.25 inch and 1.25 inch.

In at least one implementation, each one of the first and second linear cut line portions includes a notch having a pair of parallel linear edges spaced apart from each other to define a gap therebetween.

In at least one implementation, each one of the first and second linear cut line portions include a pair of parallel linear edges extending along each other and contacting each other.

In at least one implementation, the removable liner portion defines a first removable liner portion, the label support liner further including a second removable liner portion separable from the main liner portion, the label overlapping the first and second removable liner portions and the main liner portion.

In at least one implementation, the label defines a first label, the label layer including a second label located proximal to the first label, the second label overlapping the second removable liner portion and the main liner portion.

In at least one implementation, the label layer further includes a non-label portion affixed to the label receiving surface and disposed adjacent the label.

In at least one implementation, the label and the non-label portion together cover an entire surface area of the label receiving surface.

In at least one implementation, the label defines a first label, the label layer including a second label disposed side-by-side with the first label.

In at least one implementation, the non-label portion includes a non-label cut line extending between the first and second labels, the non-label cut line being aligned with the liner cut line to divide the non-label portion into a non-label removable section superposed over the removable liner portion and a non-label main section superposed over the main liner section.

In at least one implementation, the label assembly further includes a tear line extending between the first and second labels.

In at least one implementation, the first and second labels are spaced from each other.

In at least one implementation, the first and second labels are contiguous to each other.

In at least one implementation, once the label has been removed from the label support liner, the label includes a first stiffness section having a first stiffness and a second stiffness section having a second stiffness different from the first stiffness.

In at least one implementation, the first stiffness section includes the first label portion and the second stiffness section includes the second label portion affixed to the removable liner portion, the second stiffness being greater than the first stiffness.

In at least one implementation, the label includes a plurality of label sections separable from each other.

In at least one implementation, each one of the plurality of label sections overlaps both the main liner portion and the removable liner portion.

In at least one implementation, the plurality of label sections includes a first label section located towards the removable liner portion and a second label section located towards the main liner portion, the first and second label sections being separable from each other.

In at least one implementation, each label includes a label tear line extending between the first and second label sections.

In at least one implementation, the first label section is superposed only over the removable liner portion and the second label section overlaps the removable liner portion and the main liner portion.

In at least one implementation, the first label section overlaps the removable liner portion and the main liner portion, and the second label section is superposed only over the main liner portion.

In at least one implementation, the first label section is blank and the second label section is preprinted.

In at least one implementation, the first label section includes a first information and the second label section includes a second information related to the first information.

In at least one implementation, the first label section includes a first identifier and the second label section includes a second identifier associated with the first identifier.

In at least one implementation, the liner includes at least one label position indicator to provide an indication relative to a position of the label on the liner.

In at least one implementation, each label position indicator includes a printed marking defined on a bottom liner face of the liner opposite the label receiving surface.

In at least one implementation, the label is blank.

In at least one implementation, the label is preprinted.

According to another aspect, there is also provided a method for affixing a label to a surface, the method including: providing a label assembly including the label releasably affixed to a label receiving surface of a label support liner, the label support liner including a main liner portion and a removable liner portion separable from the main liner portion, the label including a first label portion overlapping the main liner portion and a second label portion overlapping the removable liner portion; separating the removable liner portion from the main liner portion with the second label portion remaining affixed to the removable liner portion; moving the removable liner portion away from the label receiving surface on the main liner portion to peel the first label portion from the main liner portion; affixing the first label portion of the label on the surface.

In at least one implementation, the method further comprises, after affixing the first label portion of the label on the surface: removing the removable liner portion from the second label portion; and affixing the second label portion of the label on the surface.

In at least one implementation, removing the removable liner portion from the second label portion includes separating a first label section superposed only over the removable liner portion from a second label section overlapping the removable liner portion and comprising the first label portion.

In at least one implementation, the method further comprises, after separating the first label section from the second label section, removing the first label section from the removable liner portion.

In at least one implementation, affixing the first label portion of the label on the surface includes applying an adhesive underside surface of the first label portion on the surface.

In at least one implementation, the method further comprises, after affixing the first label portion of the label on the surface: separating a first label section of the label overlapping the removable liner portion from a second label section comprising the first label portion along a label tear line of the label; and removing the first label section and the removable liner portion from the second label section.

According to yet another aspect, there is also provided a container labeling kit comprising: a container having an outer container surface; a label assembly for labeling the container, the label assembly comprising: a label support liner having a label receiving surface comprising a release coating, the label support liner including a main liner portion and a removable liner portion separable from the main liner portion; and a label layer extending over the label receiving surface, the label layer including: a label releasably affixed to the label receiving surface, the label being removable from the main liner portion to be affixed to the outer container surface, the label including a first label portion overlapping the main liner portion and a second label portion overlapping the removable liner portion such that separating the removable liner portion from the main liner portion and moving the removable liner portion away from the label receiving surface peels the first label portion away from the main liner portion while the second label portion remains affixed to the removable liner portion.

In at least one implementation, the container is a specimen container for receiving one of a medical specimen and a biological specimen.

According to yet another aspect, there is also provided a label assembly including: a label including a facestock having a facestock lower surface affixable to a surface; a removable liner portion removably affixed to the facestock lower surface, the removable liner portion being superposed over a label portion of the label; wherein, when the removable liner portion is affixed to the label, the label assembly has a first Taber stiffness determined by a 15° angle Taber V-5 stiffness test; and wherein, when the removable liner portion is removed from the label, the label has a second Taber stiffness determined by a 15° angle Taber V-5 stiffness test, the first Taber stiffness being at least 1% greater than the second Taber stiffness.

In at least one implementation, the first Taber stiffness is at least 10% greater than the second Taber stiffness.

BRIEF DESCRIPTION OF THE DRAWINGS

FIG. 33C is a side elevation view of a container and a label of the label assembly of FIG. 31 affixed to a corresponding removable liner portion, with the label being affixed to the container.

FIG. 33D is a side elevation view of the container and the label of the label assembly as shown in FIG. 33C, with a second label section of the label being partially affixed to the container, and a first label section of the label being separated from the second label section along a label tear line and being removed along with the removable liner portion from the second label section.

FIG. 33E is a side elevation view of the container and the label of the label assembly as shown in FIG. 33C, with the second label section being fully affixed to the container.

FIG. 36C is a side elevation view of a container and a label of the label assembly of FIG. 34 affixed to a corresponding removable liner portion, with the label being affixed to the container.

FIG. 36D is a side elevation view of the container and the label of the label assembly as shown in FIG. 36C, with a second label section of the label being partially affixed to the container, and the removable liner portion being removed from the second label section such that a first label section superposed only over the removable liner portion is separated from the second label section.

FIG. 36E is a side elevation view of the container and the label of the label assembly as shown in FIG. 36C, with the second label section being fully affixed to the container.

DETAILED DESCRIPTION

Figure 1:
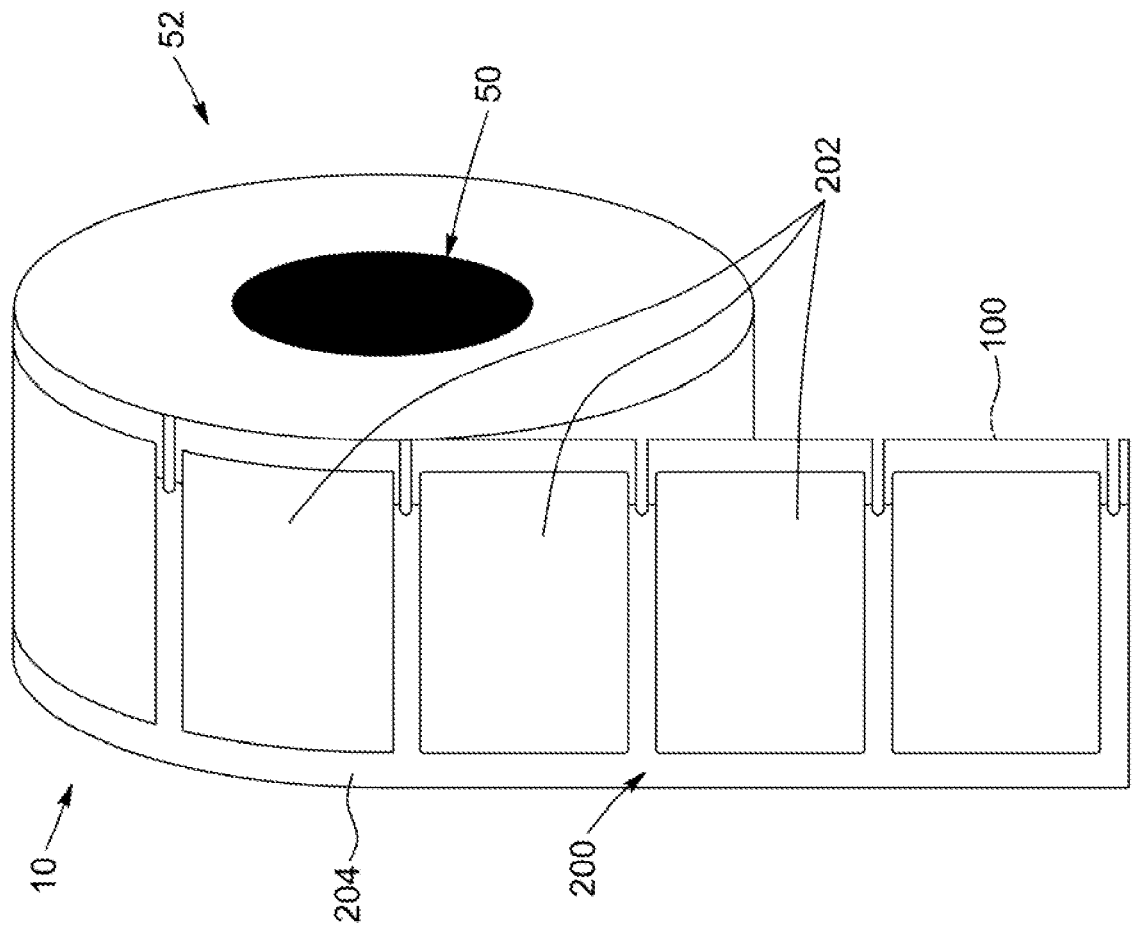
FIG. 1 is a perspective view of a label assembly in accordance with one implementation, showing the label assembly wound around a core to form a label roll.

Label assemblies and methods for affixing a label to an item are described herein. The label assemblies described herein can include a label support liner and a label layer extending over the label support liner. The label support liner can include a main liner portion and a removable liner portion separable from the main liner portion. The label layer can include one or more label(s) releasably affixed to the liner and overlapping the main liner portion and the removable liner portion. To remove the label from the liner, the removable liner portion can be separated from the main liner portion and moved away from the main liner portion to peel the label off the main liner portion while a portion of the label remains affixed to the removable liner portion.

The removable liner portion can be located near a liner side edge of the liner. The removable liner portion is delimited by a liner cut line which, in some implementations, may be C-shaped. Any other shape or shapes are contemplated including, but not limited to, a rectangle or a rectangle-like shape, a square or a square-like shape, a circular shape or a semi-circular shape or the like, an oval or an oval-like shape, a triangular shape or a triangle-like shape, a polygonal shape or polygonal-like shape with any number of angles (e.g. pentagon, hexagon, heptagon, octagon, nonagon, decagon, etc.), a parallelogram or a parallelogram-like shape, a trapezoid or a trapezoid-like shape, a rhombus or rhombus-like shape, a kite or kite-like shape, a quadrilateral or quadrilateral-like shape, a flower shape or the like, a star shape or alike, an irregular shape, an asymmetric shape, hybrid shapes, or a shape combining elements of other shapes and/or their combination or fusion.

In some implementations, the label layer can include a plurality of labels disposed side-by-side or at least proximal to each other on the liner. The liner would therefore include a main liner portion and a plurality of removable liner portions, with each label overlapping a corresponding removable liner portion. The removable liner portions can be positioned adjacent each other along the liner side edge. The liner cut line may include notches extending from the liner side edge and creating gaps between adjacent removable liner portions, or may include slits such that the adjacent removable liner portions are contiguous to each other.

The label layer can also include a non-label or waste portion affixed to the label receiving surface of the liner and surrounding the label, or alternatively, the label layer may not include a waste portion and may only include the labels when the label assembly is provided to a user.

Providing a removable liner portion which can be separated from the main liner portion and which remains affixed to the label when the label is peeled off the liner may facilitate the peeling of the label off the liner and may also facilitate the manipulation of the label once the label has been removed from the liner and the affixing of the label to the desired surface. For example, the removable liner portion can prevent the label from sticking to the user's finger or gloves, which would impede the manipulation of the label. Moreover, by eliminating the need for the user to directly touch the label's adhesive, this configuration can reduce or eliminate the risk for a user to have an allergic reaction upon contact with the adhesive to natural rubber or latex or other ingredients which may be used in the adhesive.

The removable liner portion further acts as a reinforcement to rigidify or increase the stiffness of label to reduce the bending of the label during the peeling, handling and affixing of the label.

Moreover, in an implementation in which notches are provided in a liner side edge between adjacent removable liner portions, the notches may provide indications relative to the position of the labels to a sensor used for printing an inscription, such as indicia, markings, instructions, graphics, logos, serial numbering, text, an image, a barcode or the like, and/or for encoding a wireless tag such as RFID, NFC and the like on the labels, such as a sensor of a label printer for example, thereby facilitating the printing of an inscription on the labels. As will be explained further below, the use of an additional notch or plurality of notches of any shape, form and configuration in any location of the label assembly or between label assemblies is also contemplated.

The label assemblies and methods described hereinafter may be used in any industry where labels are used. Some implementations of the label assemblies and methods may further be particularly well suited for use in certain industries. In particular, the labels used in some industries such as in biotechnology, biomedicine, cell banking, tissue banking and other fields involving cryogenic biopreservation or freezing of biological specimen are typically required to be thinner and more flexible than in other fields and are therefore substantially more difficult to peel using prior art methods. For example, it has been shown that cryogenic label materials that are intended for use at −80° C. and below such as inside liquid nitrogen tanks at −196° C. or below or that are exposed to liquid helium at −269° C. may have facestock elongation values between 10% and 300% or even more. It will however be understood that the label assemblies and methods described hereinafter are not limited to use in these fields, and may be used instead in other fields such as packaging, automotive, electrical, electronics, avionics, aerospace, food, chemical, agricultural, fashion, gas and oil, plumbing, heavy industrial, light industrial, construction, or any other suitable filed or industry.

Figure 3:
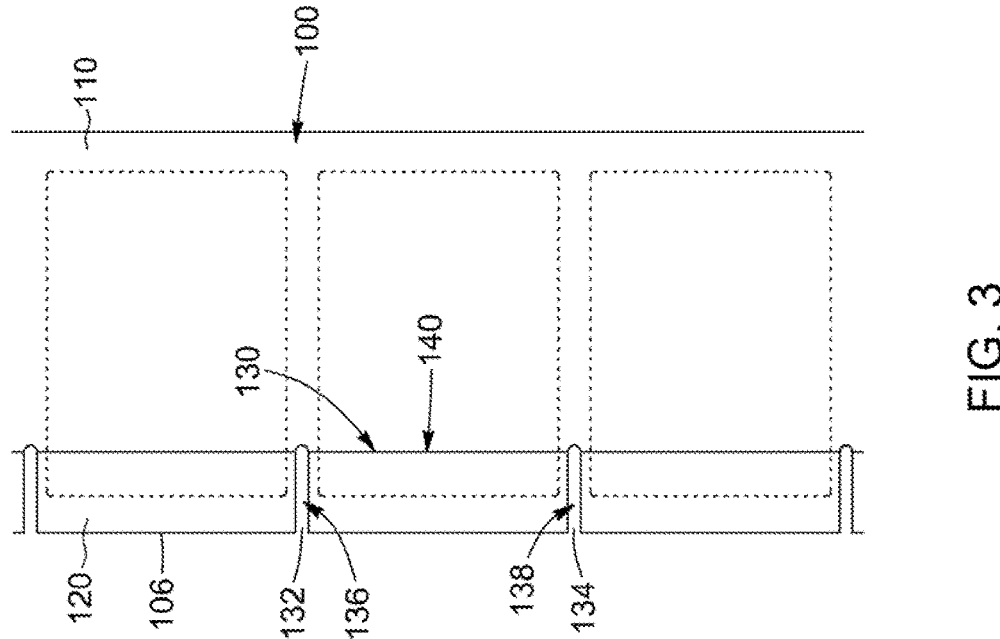
FIG. 3 is a bottom plan view of the label assembly of FIG. 1.
Figure 2:
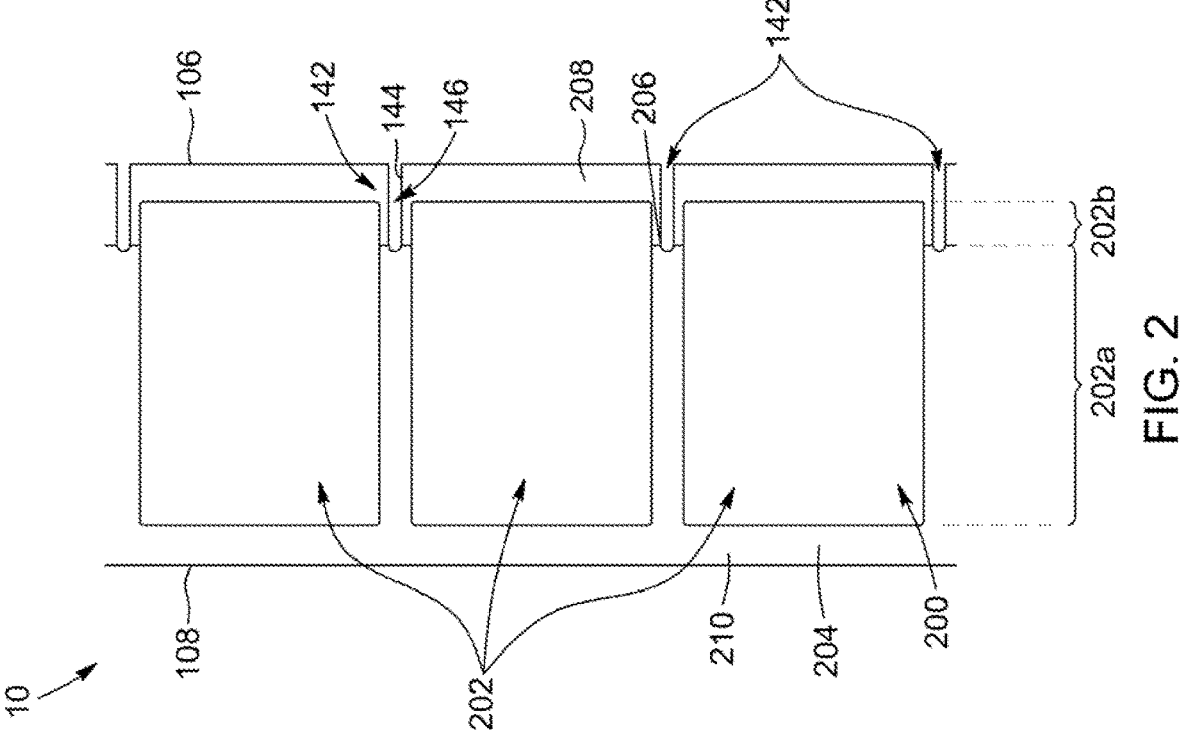
FIG. 2 is a top plan view of the label assembly of FIG. 1.

Referring now to FIGS. 1 to 3, there is schematically illustrated a label assembly (10), in accordance with one implementation. The label assembly (10) includes a label support liner (100) and a label layer (200) superposed over the label support liner (100). In the implementation of FIG. 1, the label layer (200) includes a plurality of discrete labels (202) releasably affixed to the label support liner (100) and a non-label or "waste" portion (204) disposed adjacent the labels (202) such that the label (202) and the waste portion (204) together cover an entire surface area of the label support liner (100). Specifically, the waste portion (204) is generally made from the same material as the labels (202), although the use of different materials within the same label assembly or within the same assembly template is contemplated.

Although FIGS. 1 to 3 shows the label layer (200) comprising a plurality of labels (202), it will be understood that the label layer (200) could instead include a single label.

When in use, the labels (202) are peeled off from the label support liner (100) to reveal an adhesive underside surface of the label support liner (100). The label (202) can then be affixed, either removably or permanently, to an item.

In one implementation, the waste portion (204) is not removed from the label support liner (100) such that it remains on the label support liner (100) once the label (202) has been removed.

It will be understood that the term "waste portion" is used herein to generally refer to a portion of the label layer (200) which is located adjacent and is distinct from the label (202). In some implementations, the waste portion (204) may be discarded along with the label support liner (100) once the label (202) has been removed. In another implementation, the "waste" portion (204) may include other usable elements such as printed indicia, markings, instructions, graphics, logos, serial numbering, barcode, one or more sticker portions which could also be releasably affixed to the label support liner (100) and be removable from the label support liner (100).

In the implementation of FIGS. 1 to 3, the label assembly (10) is elongated and generally ribbon-shaped, and is wound around a central core (50) to define a label roll (52). Alternatively, the label assembly (10) could instead be configured as a sheet, a fanfold, a strip, a booklet or in any other suitable format.

Figure 4A:
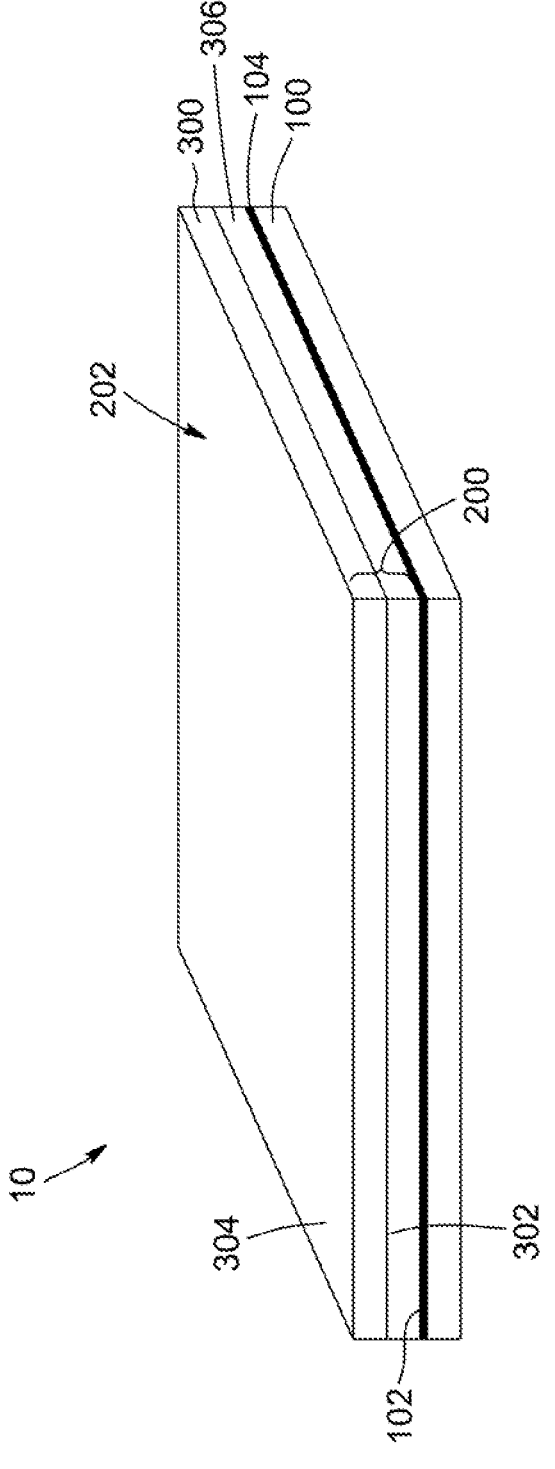
FIG. 4A is a perspective view of a portion of the label assembly of FIG. 1, showing layers of the label assembly.
Figure 4B:
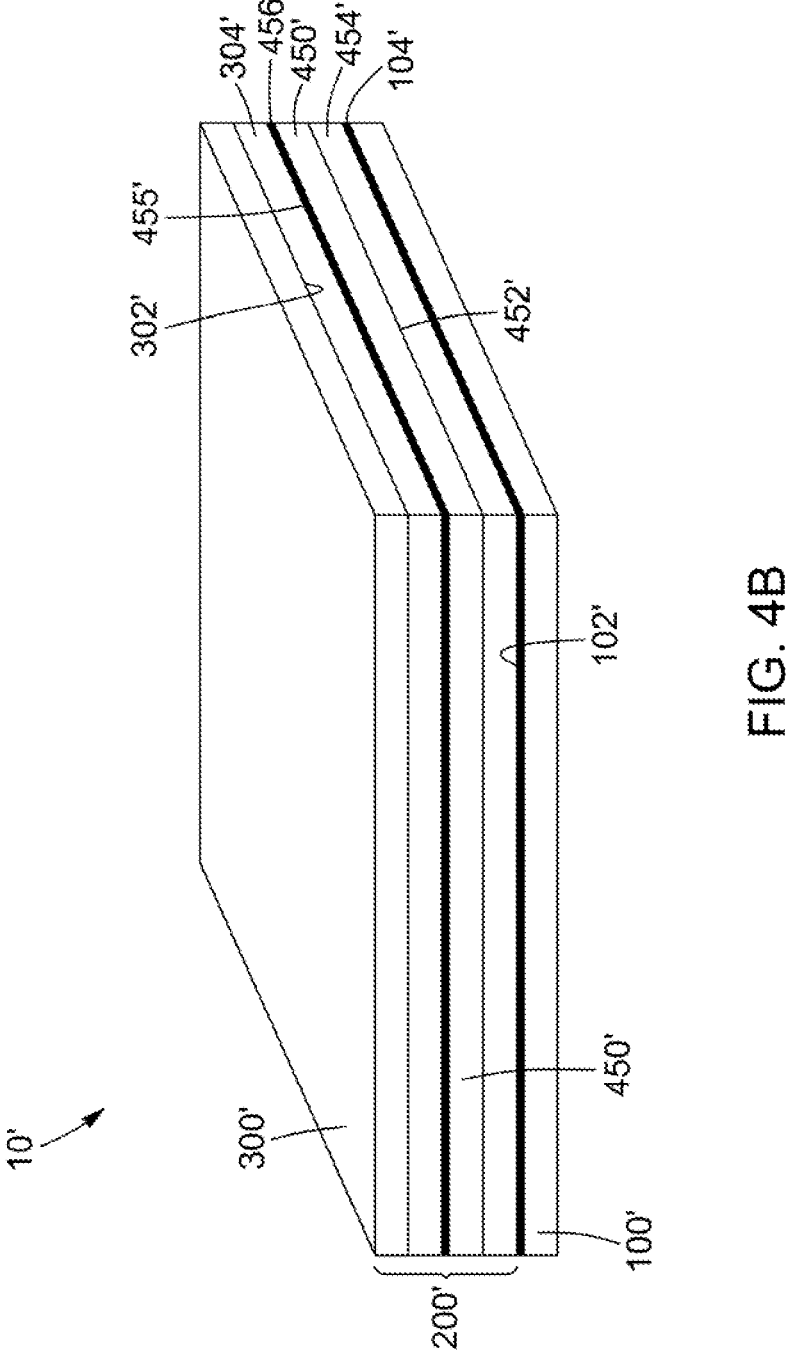
FIG. 4B is a perspective view of a portion of the label assembly, in accordance with another implementation, with the label assembly in a piggyback label configuration.

Referring now to FIG. 4A, there is shown a section of the label assembly (10) illustrated in FIGS. 1 to 3, in accordance with one implementation. In this implementation, the label support liner (100) includes a label receiving surface (102) and the label layer (200) is affixed to the label receiving surface (102). More specifically, the label layer (200) includes a label facestock (300) having a facestock lower surface (302) releasably affixed to the label receiving surface (102) of the label support liner (100), and a facestock upper surface (304). The facestock lower surface (302) of the label facestock (300) is further coated with a label facestock adhesive (306) and the label receiving surface (102) of the label support liner (100) is coated with a release coating (104), thereby allowing the label facestock (300) to be easily released from the label receiving surface (102) of the label support liner (100) and to be affixed to an item. In another implementation, the label assembly (10) may not include a facestock adhesive. Instead, the facestock (300) may include a static cling facestock which is configured to releasably stick to the label support liner (100) and to a surface on which the label (202) is to be affixed via static cohesive force rather than via an adhesive.

In one scenario, the label support liner (100) can be a release liner and more particularly, a paper or plastic-based film continuous roll or sheet. The label support liner (100) can be coated on one or both surface(s) with a release agent such as a silicone or fluorosilicone forming the release coating (104), which can provide a release effect against the sticky material (e.g. the label facestock adhesive (306)). In one implementation, the label support liner (100) can be provided as a continuous roll of liner material or in sheet form, and can include paper (e.g., Kraft paper, super calendered Kraft paper, glassine, clay coated Kraft paper, coated paper, machine finished Kraft paper, machine glazed paper, etc.) or a plastic film (e.g., a polyethylene terephthalate (PET) film, a polypropylene (PP) film, a biaxially oriented polypropylene (BOPP) film, a polyolefin film, or other polymer-comprising material, or a composite material or a combination of paper and polymer based materials), while the release coating can include, as mentioned above, silicone (e.g., crosslinkable silicone, fluorosilicone, etc.), or any material or substance that has a low surface energy such as, for example, fluorochemicals, waxes, paraffins, water-based release coatings, oil-based release coatings, solvent-based release coatings, biodegradable release coatings, phosphate ester-based release coatings, etc.). In some cases, the label support liner (100) can have imaging capabilities such that when pressure is applied on the label facestock, the label facestock (300) acts as a carbon paper to transfer the image on the label support liner (100). This may be useful in some circumstances in which it may be desirable to preserve a copy of what was written on the label, such as in some medical and clinical forms.

In one implementation, the label support liner (100) could have a thickness of between about 0.5 mil and 15 mil. More specifically, the label support liner (100) could have a thickness of between about 0.8 mil and 1.6 mil, or of between about 1.6 mil and 4.0 mil, or of between about 2.4 mil and 6.0 mil.

The label facestock (300) can be a paper-based (e.g. comprising a cellulose fiber) or plastic-based film roll or sheet, or a composite material roll or sheet. In some implementations, the label facestock (300) can comprise any layers of other materials, lamination, coating, varnish, ink-receptive surfaces, ink, thermochromic ink, direct-thermal material (i.e. material inside which ink is incorporated and released upon heating), adhesive layer (such as in double-sided label constructs) or any other suitable layer or component. The label facestock (300) can be opaque, transparent, translucent, hazy, or any combinations thereof, and can be made from any material that can be used as a label material. This includes but not limited to a polymer, a thermoplastic film, a thermoset film, plastic such as for example polyester (PET), polyvinyl, polypropylene (PP), biaxially oriented polypropylene (BOPP), polystyrene, acrylic, acrylate, polyimide, polyethylene, thermoplastic, polyolefin, fabric, tissue, cloth, paper, polymer impregnated material or polymer enforced material, paper, materials containing cellulose fibers, satin, nylon, carbon-enforced materials, woven fabric, non-woven fabric, Tyvek, magnetic, foil including aluminum foil, metallic films, rubber, silicone rubber, synthetic films, composite materials or any combination thereof (e.g. latex impregnated paper, a combination of a paper and cloth, or a paper and polymer combination). In other implementations, the label facestock (300) could instead be made from graphene and other types of nanomaterials.

In one implementation, the label facestock (300) could have a thickness equal to or less than about 20.0 mil. More specifically, the label facestock (300) could have a thickness of between about 0.3 mil and 12.0 mil, and even more specifically, the label facestock (300) could have a thickness of between about 0.4 mil and 6 mil, or of between about 0.8 mil and 4.8 mil, or still more specifically, of between about 0.9 mil and 3.8 mil.

In implementations in which the label layer (200) includes a label facestock adhesive (306), the label facestock adhesive (306) can be any type of adhesive including pressure-sensitive adhesives, and non-limitative examples include a permanent adhesive, a removable adhesive, a repositionable adhesive, a water-based acrylic, an emulsion adhesive, a hot melt, a rubber-based adhesive, a latex-based adhesive, a solvent-based adhesive, a silicon-based adhesive, a UV-curable adhesive, a LED-curable adhesive including a LED-UV-curable adhesive, a cross-linked adhesive, any combination thereof, etc. Similarly, in one scenario, the label facestock adhesive (306) can be permanent, while in another scenario, the label facestock adhesive (306) can be removable, allowing repositioning of the label (202) on the surface to be labelled. The label facestock adhesive (306) can also be a glove-friendly removable adhesive, for example. It is noted that any pressure-sensitive adhesive could be used. In some implementations, the label facestock adhesive (306) can be weakened or even neutralized at one or more locations using any adhesive neutralizing agent such as a varnish, an ink or UV varnish, a UV ink or the like. In some implementations, the label facestock adhesive (306) can be applied according to a certain pattern covering only a portion of the facestock lower surface (302) such that a remaining portion of the facestock lower surface (302) is devoid of any adhesive.

In one implementation, the label facestock adhesive (306) could have a thickness equal to or less than about 25.0 mil. More specifically, the label facestock adhesive (306) could have a thickness of between about 0.05 mil and 12.0 mil, and even more specifically, the label facestock adhesive (306) could have a thickness of between about 0.4 mil and 6 mil, or of between about 0.6 mil and 3.0 mil, or still more specifically, of between about 0.7 mil and 1.5 mil.

In some implementations, the label facestock (300) may be printed using a printing technique such as thermal-transfer printing, direct thermal printing, laser printing, inkjet printing (including water-based and UV inkjet printing), ultraviolet or UV printing, light emitting diode or LED printing, liquid electrophotography or LEP printing, nano-transfer printing, using impact printers including dot-matrix printers, digital printers, flexographic, offset, lithography, screen-printer, letterpress, gravure, xerography, die-sublimation, laser-etching, manual writing using a pen, pencil, marking pen such as a permanent marker, stamping with ink including hot-foil stamping, cold-foil stamping, embossing, electron beam or EB printer or any other technique that would allow an inscription to be provided on the label facestock (300).

In some implementations, the label facestock (300) may be printed using a printer with wireless encoding capabilities such as Radio Frequency Identification (RFID) Near Field Communication (NFC), Bluetooth, WiFi or the like. For example, in one implementation, the label facestock (300) may be printed using an RFID barcode printer commercialized by Zebra Technologies Inc., Datamax-O'Neil Corporation, SATO America, Toshiba Corporation or the like. The printer may further be one of a mobile printer, a desktop printer and an industrial printer.

It will be understood that the printing techniques listed above are non-limitative examples and any device capable of printing a label or applying an ink is contemplated. This also includes any printing technology incorporated or associated with a robotic or automation device or label peelers and/or label applicators. Alternatively, the label facestock (300) can be blank. In yet another implementation, the label facestock (300) may not be printed using any ink and the label (202) could be encoded using a wireless encoding device such as an RFID encoding device, an NFC encoding device, a Bluetooth encoding device or the like.

It is further contemplated that the label (202) could include a wireless communication device such as an RFID wet or dry inlay or any other type of RFID tag, a near field communication or NFC tag, a Bluetooth device or any other suitable wireless communication device. More generally, the label (202) could include any type of electronic component, any type of a wire or antenna or any similar suitable component.

It will be understood that the above-described configuration of the label layer (200) is provided merely as an example and that the label layer (200) may instead have one of various alternative configurations in which the label layer (200) may include different layers, additional layers, or other components or structures. For example, the labels (202) could include piggyback labels or self-laminating labels, or any other types of labels which a skilled person would consider to be suitable.

Turning to FIG. 48, there is shown a section of a label assembly (10'), in accordance with another implementation. In this implementation, the label assembly (10') is configured in a piggyback configuration and includes a base label support liner (100') and a label layer (200') superposed over the base label support liner (100'). In this implementation, the label layer (200') includes an intermediate label support liner (450') superposed over the base label support liner (100') and a label facestock (300') superposed over the intermediate label support liner (450').

In this implementation, instead of being affixed directly to the base label support liner (100'), the label facestock (300') is therefore releasably affixed to the intermediate label support liner (450'), which is itself releasably affixed to the base label support liner (100'). Specifically, the base label support liner (100') includes an intermediate liner receiving surface (102') and the intermediate label support liner (450') is releasably affixed to the intermediate liner receiving surface (102'). More specifically, the intermediate label support liner (450') includes a intermediate liner lower surface (452') coated with an intermediate liner adhesive (454'), and the intermediate liner receiving surface (102') of the base label support liner (100') is coated with a release coating (104'), thereby allowing the intermediate label support liner (450') with the label facestock (300') affixed to the intermediate label support liner (450') to be easily released from the intermediate liner receiving surface (102') of the base label support liner (100') and to be affixed to a first surface.

The intermediate label support liner (450') further includes a facestock receiving surface (455') and the label facestock (300') is releasably affixed to the facestock receiving surface (455'). More specifically, the label facestock (300') includes a facestock lower surface (302') coated with a facestock adhesive (304') and the facestock receiving surface (455') of the intermediate label support liner (450') is coated with a release coating (456'), thereby allowing the label facestock (300') affixed to the intermediate label support liner (450') to be easily released from the facestock receiving surface (455') of the intermediate label support liner (450') and to be affixed to a surface, such as the first surface to which the intermediate label support liner (450') has been affixed or a second surface different from the first surface.

In one implementation, the label facestock (300') is released from the intermediate label support liner (450') once the intermediate label support liner (450') has been itself released from the base label support liner (100') and has been affixed to a surface. Alternatively, the label facestock (300') could be released from the intermediate label support liner (450') while the intermediate label support liner (450') is still affixed to the base label support liner (100').

Referring back to FIGS. 2 and 3, the label support liner (100) includes first and second liner side edges (106, 108) which are both linear and extend parallel to each other. The label support liner (100) is divided into a main liner portion (110) and a plurality of removable liner portions (120) located adjacent the main liner portion (110). In this implementation, each label (202) is positioned on the label support liner (100) such that it overlaps both the main liner portion (110) and a corresponding removable liner portion (120). More specifically, the label (202) includes a first label portion (202a) which overlaps the main liner portion (110) and a second label portion (202b) which overlaps the removable liner portion (120).

As best shown in FIG. 3, each removable liner portion (120) is located adjacent the first liner side edge (106) of the label assembly (10) and is delimited by a liner cut line (130). Specifically, the liner cut line (130) includes a first cut line end (132) located towards the first liner side edge (106) and a second cut line end (134) also located towards the first liner side edge (106).

In the implementation shown in FIGS. 2 and 3, the liner cut line (130) extends all the way to the first liner side edge (106). In other words, the liner cut line (130) intersects the first liner side edge (106) at the first and second cut line ends (132, 134). In another implementation, the liner cut line (130) may not extend all the way to the first liner side edge (106). Instead, the first and second cut line ends (132, 134) could be spaced from the first liner side edge (106) by a relatively small distance, such as a distance of between about 1 and 2 mm for example. In other words, the removable liner portion (120) would be connected to the main liner portion (110) by two small connecting liner portions located at the first liner side edge (106) and measuring about 1 to 2 mm in length. In this implementation, the user would have to break these small connecting liner portions to separate the removable liner portion (120) from the main liner portion (110). Depending on the material selection and configuration of the label assembly (10), the connecting liner portions might be even measure more than 2 mm if the connecting liner portions can still be broken such that the removable liner portion (120) can be properly separated from the main liner portion (110) and the labels (202) can be properly peeled as described herein.

Although the removable liner portions (120) shown located adjacent the first liner side edge (106), it will be understood that the removable liner portions (120) could instead be located adjacent the second liner side edge (108), or could be located alternately adjacent to the first liner side edge (106) and to the second liner side edge (108).

In the implementation illustrated in FIGS. 2 and 3, the liner cut line (130) is generally C-shaped and includes first and second linear cut line portions (136, 138) extending away from the first liner side edge (106) and a third linear cut line portion (140) extending between the first and second linear cut line portions (136, 138). Specifically, the first and second linear cut line portions (136, 138) extend substantially parallel to each other and substantially perpendicular to the first liner side edge (106), and the third linear cut line portion (140) extend substantially parallel to the first liner side edge (106). In one implementation, the third linear cut line portion (140) could be spaced from the first liner side edge (106) by a distance of between about 0.06 inch and 4.3 inches. More specifically, the third linear cut line portion (140) could be spaced from the first liner side edge (106) by a distance of between about 0.06 inches and 0.5 inch, and even more specifically, the third linear cut line portion (140) could be spaced from the first liner side edge (106) by a distance of between about 0.25 inches and 1.25 inches. Alternatively, the third linear cut line portion (140) could be spaced from the first liner side edge (106) by any suitable distance.

In other implementations, the first and second linear cut line portions (136, 138) could instead be angled relative to each other, and/or the third linear cut line portion (140) could be angled relative to the first liner side edge (106). In yet other implementations, instead of including only cut line portions which are linear, the liner cut liner (130) may include one or more curved line portion or a combination of curved and straight line portions.

It will therefore be understood that in this configuration, the removable liner portion (120) is fully distinct from the main liner portion (110) and is only held in its position adjacent to the main liner portion (110) by the label (202) overlapping both the removable liner portion (120) and the main liner portion (110) and being affixed to the removable liner portion (120) and the main liner portion (110). The removable liner portion (120) thereby defines a flap or tab on the first liner side edge (106) which can be manipulated by a user to peel off the label (202) from the main liner portion (110).

Although FIGS. 2 and 3 show the first and second linear cut line portions (136, 138) intersecting the third linear cutline portion (140), in another implementation, a small space of about 1 to 2 mm may be left between the first linear cutline portion (136) and the third linear cut line portion (140) and/or between the second linear cut line portion (138) and the third linear cut line portion (140). In other words, the removable liner portion (120) would be connected to the main liner portion (110) by one or two small connecting liner portions located at the third linear cut line portion (140). In this implementation, the user would break these small connecting liner portions to separate the removable liner portion (120) from the main liner portion (110).

It will also be understood that the terms "removable liner portion" and "main liner portion" are not indicative of their proportional sizes relative to each other. For example, in the embodiment illustrated in FIGS. 1-3, the removable liner portions (120) are smaller than the main liner portion (110). Alternatively, the removable liner portion (120) could be similar in size or larger than the main liner portion (110).

It will further be understood that, although the labels (202) are shown as being rectangular in the accompanying figures, the labels (202) could instead be of any shape or irregular or asymmetric in any configuration. For example, the labels (202) can be shaped as a rectangle, square, circle, oval, triangle, hexagon, octagon, polygon, a hybrid shape comprising elements of more than one shape or a template comprising a combination of any shapes.

In some implementations, the label (202) may be a tamper evident label and may include one or more cuts defined in the label facestock (300) such that, once the label (202) has been released from the label support liner (100) and affixed to a surface, it would be relatively difficult or even impossible to remove the label (202) from the surface. The term "tamper evident label" may comprise any label that can provide an evidence of tampering such as destructible labels crumbling into pieces upon attempt to remove them.

In some implementations, the labels (202) may be spaced from the first liner side edge (106) so as to facilitate the peeling of the label (202) from the main liner portion (110). For example, each label (202) may be spaced from the first liner side edge (106) by a distance of between about 0 mm and 30 mm, or more specifically by a distance of between about 1 mm and 5 mm. In other implementations, each label (202) may be spaced from the first liner side edge (106) by a distance of between about 0 mm and 5 mm. In other implementations, the labels (202) could instead extend all the way to the first liner side edge (106) and thereby be located adjacent the first liner side edge (106) such that they cover entirely the removable liner portion (120). In some implementations, the labels (202) could also extend all the way to the second liner side edge (108).

It will also be understood that although the labels (202) are shown in FIGS. 1 to 3 as being spaced from each other, the labels (202) could instead be contiguous to each other.

In some implementations, in addition to the first, second and third linear cut line portions (136, 138, 140), the liner cut line (130) could include additional cut line portions while in other implementations, the liner cut line (130) could instead include less than three cut line portions. It will further be understood that the present label assembly (10) does not exclude the presence of additional cut lines similar to the cut line portions (136, 138, 140) and located at other locations on the liner, or other lines and/or openings in the label support liner (100) which may be unrelated to the cut line (130) defining the removable liner portion (120).

In the implementation of FIGS. 2 and 3, the first and second cut line portions (136, 138) include notches (142) which extends into the label support liner (100) from the first liner edge (106). More specifically, each notch (142) includes a pair of linear edges (144) which extend parallel to each other and which are spaced from each other to define a gap (146) therebetween. This gap (146) could facilitate the separation of the removable liner portions (120). In implementations in which the labels (202) include an inscription printed on the label (202) using a printer, the notches (142) could provide an indication of a position of the labels (202) on the label assembly (10) to allow the printer to ensure that the inscription is aligned with the label (202). For example, the printer could include an optical sensor configured to detect the notches to allow the printer to thereby detect the position of the label (202).

Alternatively, instead of including two linear edges extending parallel to each other, it is contemplated that the notches (142) could have edges which are angled to each other at a different angle. The notches (142) could also have one of various alternative shapes such as arrow-shape, rectangular shape, triangular shape, polygonal shape, semi-circle or semi-oval shape or any other possible shapes that can serve for sectioning of the removable liner portion (120) and/or detection of the label's position by a sensor of a printing device or, alternatively, of an encoding device, of an automation device, of an application device or the like. Providing additional notches in other locations is also contemplated. The notches can be of any shape, form or configuration and can be integrated within the label assembly or between the label assemblies for label position detection by the printing and/or encoding device and/or automation device depending the specifications of the device or the label or both. In some implementation, some or all of the notches may not even extend to one of the liner edges of the liner and may instead define openings through the liner and, in implementations in which the label assembly includes a waste portion, through the waste portion.

Still in the implementation of FIGS. 2 and 3, the first and second cut line portions (136, 138) are spaced from each other by a distance defining a height of the removable liner portion (120). Still in this implementation, the label (202) is substantially rectangular and has a height which is smaller than the height of the removable liner portion (120), as best shown in FIG. 2. In other implementations, the height of the removable liner portion (120) could instead be substantially equal to or smaller than the height of the label (202).

In this implementation, the waste portion (204) includes a plurality of non-label or waste portion cut lines (206). Each waste portion cut line (206) is parallel to the first side liner edge (106) and extends between adjacent labels (202). More specifically, the waste portion cut lines (206) defined in the label layer (200) are substantially aligned with the third linear cut line portions (140) defined in the label support liner (100). In this configuration, the waste portion cut lines (206) divide the waste portion (204) into a non-label or waste removable section (208) superposed over the removable liner portion (120) and a non-label or waste main section (210) superposed over the main liner section (110). When the removable liner portion (120) is separated from the main liner portion (110), the waste removable section (208) is therefore separated from the waste main section (210) and remains affixed to the removable liner portion (120).

It will be understood that although the waste portion cut lines (206) is shown as a straight line in FIGS. 1-2, the waste portion cut lines (206) could instead be configured as a zig-zag line, a quasi-circular, a quasi-oval line, an arrow-shaped line, a V-shaped line, a curvy line, double lines, or any other suitable shape and/or configuration that can provide a functionality similar to the waste portion cut lines. The use of additional waste portion cut lines on the same label assembly is also contemplated.

It will also be understood that instead of comprising only waste removable sections (208) and a waste main section (210), the waste portion (204) could include another number of separate waste sections of various shapes and sizes. In this implementation, any of the separate waste sections could be removed or left intact such that the label assembly could be completely devoid of waste if all the separate waste sections are removed, be partially devoid of waste portion if only some of the separate waste sections are removed, or have the waste portion fully in place if none of the separate waste sections are removed.

Turning now to FIGS. 5A to 5E, there is shown a method for affixing a label such as the label (200) to a surface such as an outer container surface (60) of a container (62) using the label assembly (10), in accordance with one implementation of the method.

Figure 5B:
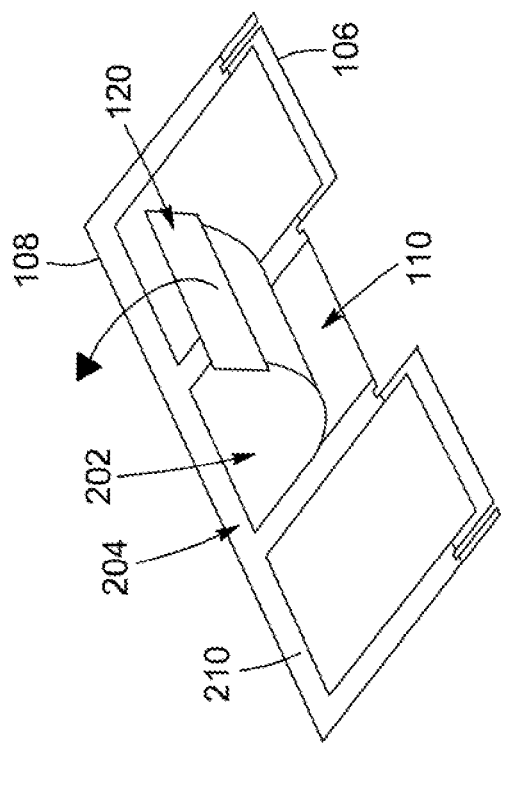
FIG. 5B is another perspective view of a portion of the label assembly of FIG. 1, with a removable liner portion of the label support liner separated from a main liner portion of the label support liner and a corresponding one of the label overlapping the separated removable liner portion being peeled off from the main liner portion.
Figure 5A:
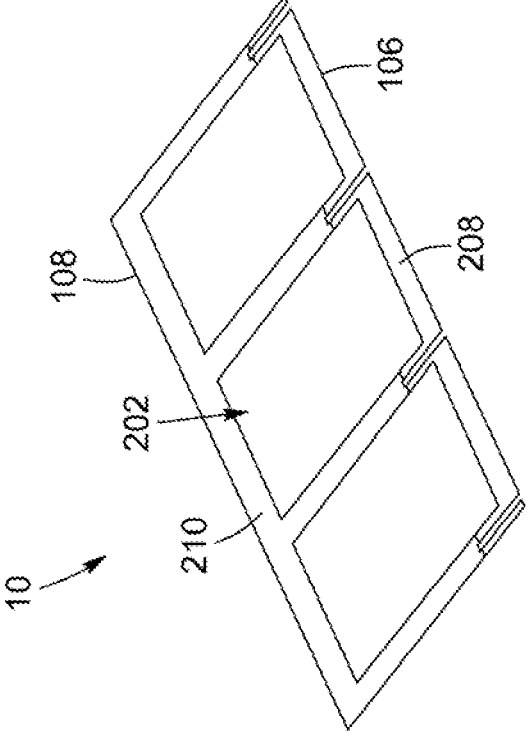
FIG. 5A is a perspective view of a portion of the label assembly of FIG. 1, with labels affixed to the label support liner.

As shown in FIG. 5A, the label assembly (10) is first provided. In this implementation of the method, the label assembly (10) provided corresponds to the implementation of FIGS. 1 to 3. Alternatively, the label assembly (10) could be configured according to any implementation of the label assembly (10) such as, but not limited to, the implementations disclosed herein.

As shown in FIG. 5B, the removable liner portion (120) is then separated from the main liner portion (110) and is moved away from the label receiving surface (102) defined on the main liner portion (110). More specifically, the removable liner portion (120) is lifted and moved towards the second liner edge (108), which causes the label (202) to peel off from the main liner portion (110) while the removable liner portion (120) remains affixed to the second label portion (202b). In this implementation, the waste removable section (208) is further separated from the waste main section (210) and remains affixed to the removable liner portion (120), while the waste main section (210) remains affixed to the main liner portion (110).

It will further be appreciated that once the label (202) has been peeled off, the label (202) now has at least two different physical and/or mechanical properties at different areas of the label. Specifically, since the removable liner portion (120) is still affixed to the second label portion (202b), the second label portion (202b), together with the removable liner portion (120), has a different stiffness, and more specifically a greater stiffness, i.e. a greater Young's modulus, compared to the first label portion (202a). Also due to the removable liner portion (120) remaining affixed to the second label portion (202b), the first and second label portions (202a, 202b) may also have different thickness, tensile behaviour, optical transparency, bending stiffness and/or rotational stiffness. This can facilitate the manipulation of the label (202) which may otherwise be relatively flimsy and may be difficult to direct to the surface on which the label (202) is to be affixed.

Figure 5E:
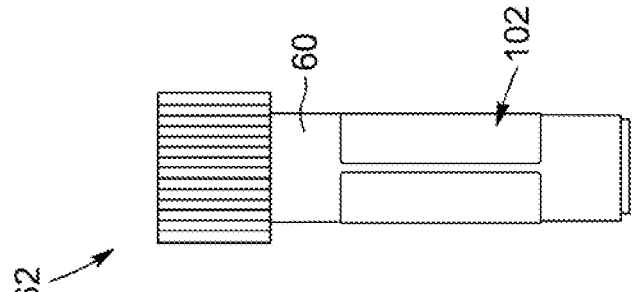
FIG. 5E is a side elevation view of the container and the label of the label assembly as shown in FIG. 5C, with the label being fully affixed to the container.
Figure 5D:
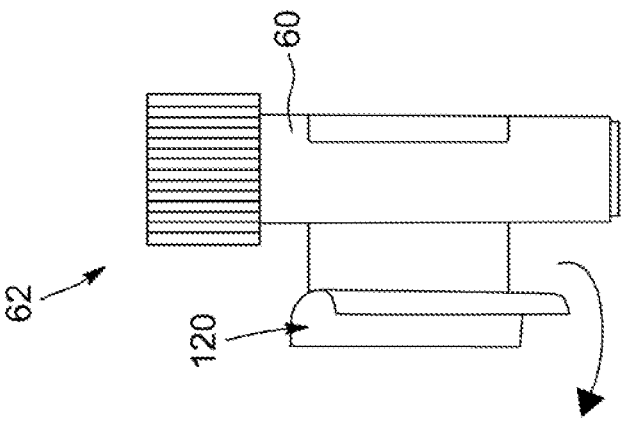
FIG. 5D is a side elevation view of the container and the label of the label assembly as shown in FIG. 5C, with the label being partially affixed to the container and the removable liner portion being removed from the label.
Figure 5C:
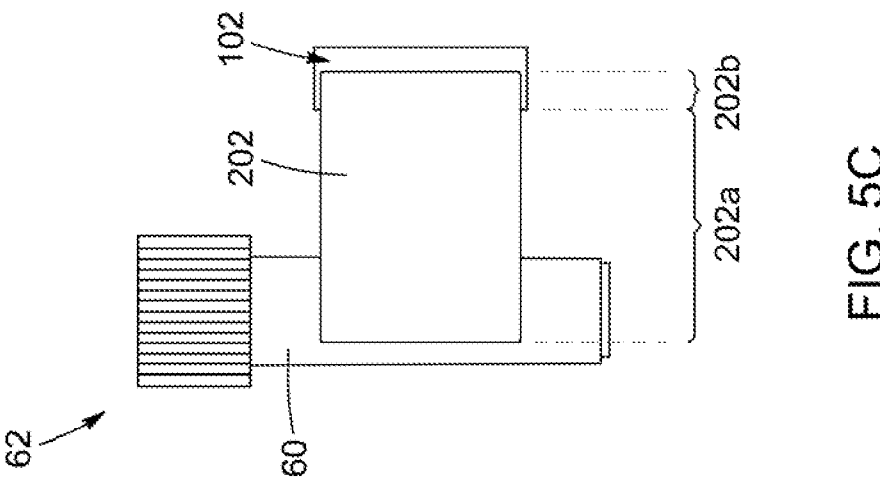
FIG. 5C is a side elevation view of a container and a label of the label assembly of FIG. 1 affixed to a corresponding removable liner portion, with the label being affixed to the container.

As shown in FIG. 5C, the label (202) is then affixed to the outer container surface (60). More specifically, the first label portion (202a) is affixed to the outer container surface (60) by applying the facestock lower surface (302) coated with the label facestock adhesive (306) on the outer container surface (60).

As shown in FIG. 5D, once the first label portion (202a) has been affixed to the outer container surface (60), the removable liner portion (120) can be removed from the label (202) to thereby expose the underside of the second label portion (202b). The second label portion (202b) can then also be affixed to the outer container surface (60) to thereby affix the entire label (202) to the outer container surface (60), as shown in FIG. 5E.

In some implementations, the removable liner portion (120) may not be removed and may be left affixed to the label (202). More specifically, only the first label portion (202a) may be affixed to the outer container surface (60), while the removable liner portion (120) remains attached to the container (62) via the label (202). In these implementations, the removable liner portion (120) may therefore be used as a tag to provide information to the user, such as for example information regarding the container (62) or the content of the container (62). For example, an inscription could be printed on the removable liner portion (120) or on the waste removable section (208) affixed to the removable liner portion (120). The removable liner portion (120) could also be blank to allow the user to manually write an indication thereon, or to receive another label containing an indication. The removable liner portion (120) could also be used to remove the label (202) from the container (62) if desired. The user could simply grasp the removable liner portion (120) and move it towards the first label portion (202a) to thereby peel the first label portion (202a) off from the outer container surface (60). In some implementations, the label (202) may incorporate one or more tear lines, perforations or cuts which would allow the user to tear away a portion of the label (202) prior, during or after the application of the label (202) or could allow the label to be used for tamper-evident applications, for example.

Figures 6, 7:
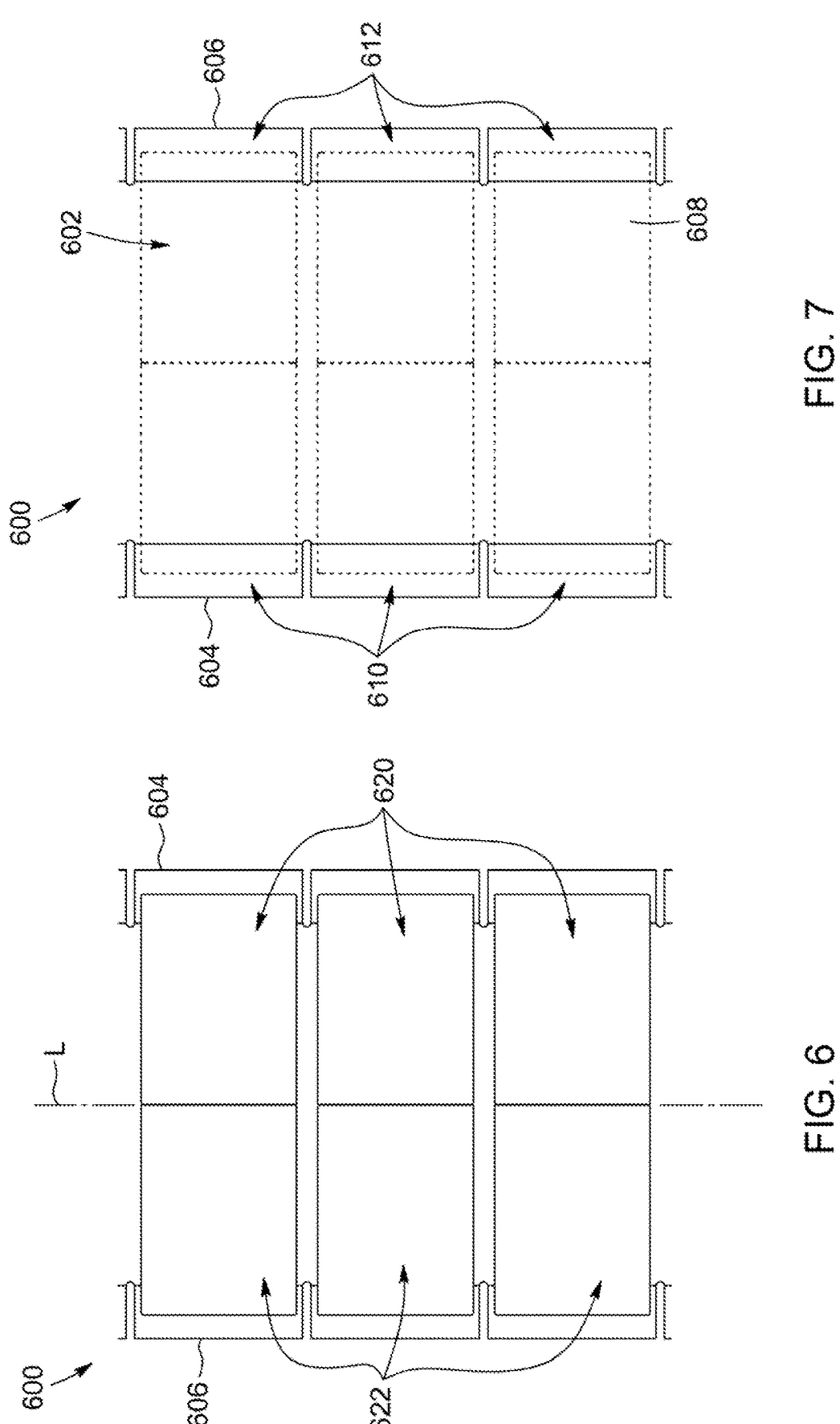
FIG. 6 is a top plan view of a label assembly, in accordance with another implementation.
FIG. 7 is a bottom plan view of the label assembly of FIG. 6.

Referring now to FIGS. 6 and 7, there is shown a label assembly (600), in accordance with another implementation. In this implementation, the label assembly (600) is substantially symmetrical about a central longitudinal axis L of the label assembly (600). Specifically, the label assembly (600) includes a label support liner (602) extending between first and second liner side edges (604, 606). The label support liner (602) includes a central main liner portion (608), a first plurality of removable liner portions (610) located along the first liner side edge (604) and a second plurality of removable liner portions (612) located along the second liner side edge (606). The label assembly (600) further includes a first plurality of labels (620) arranged in a row located towards the first liner side edge (604) and a second plurality of labels (622) arranged in a row located towards the second liner side edge (606). In this implementation, the labels (620, 622) extend all the way to the central longitudinal axis L, and therefore each label contacts a corresponding label of the other plurality of labels (620, 622). It will be appreciated that this implementation allows a greater number of labels to be provided per unit of length of the label assembly (600) than in the implementation illustrated in FIGS. 1 to 3. Although the FIGS. 6 and 7 show the labels (620, 622) arranged in a symmetrical configuration, it is contemplated that label could instead be arranged in a non-symmetrical configuration on the liner (602). It is also contemplated that instead of providing labels that are all similarly sized and shaped, labels of more than one shape and/or size maybe provided in the same label assembly.

Figures 8, 9:
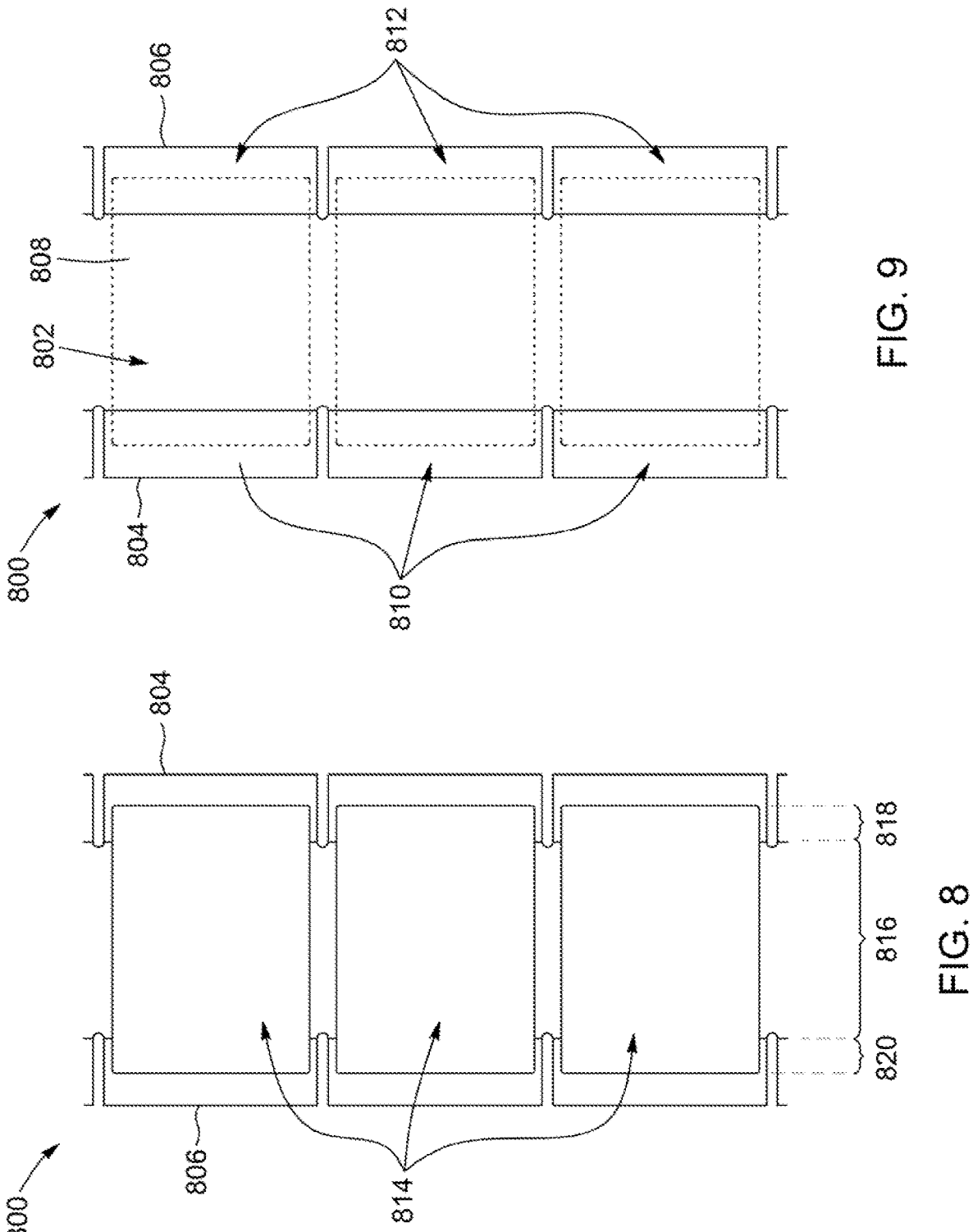
FIG. 8 is a top plan view of a label assembly, in accordance with another implementation.
FIG. 9 is a bottom plan view of the label assembly of FIG. 8.

Referring to FIGS. 8 and 9, there is shown a label assembly (800), in accordance with yet another implementation. In this implementation, the label assembly (800) includes a label support liner (802) extending between first and second liner side edges (804, 806). The liner (802) includes a central main liner portion (808), a first plurality of removable liner portions (810) located along the first liner side edge (804) and a second plurality of removable liner portions (812) located along the second liner side edge (806).

The label assembly (800) further includes a plurality of labels (814), In this implementation, instead of being arranged in two rows, the labels (814) are arranged in a single row along the label assembly (800), and each label (814) overlaps a corresponding one of the first plurality of removable liner portions (810), the central main liner portion (808) and a corresponding one of the second plurality of removable liner portions (812) aligned with the corresponding one of the first plurality of removable liner portions (810). In this embodiment, each label (814) therefore includes a central label portion (816) superposed over the central main liner portion (808), a first end label portion (818) superposed over the corresponding one of the first plurality of removable liner portions (810) and a second end label portion (820) located opposite the first end label portion (818) and superposed over the corresponding one of the second plurality of removable liner portions (812). In this implementation, each label (814) can therefore be peeled off by either end by grasping the corresponding one of either the first or second pluralities of removable liner portions (810, 812) and moving it towards the other one of the first or second pluralities of removable liner portions (810, 812).

Figures 10, 11:
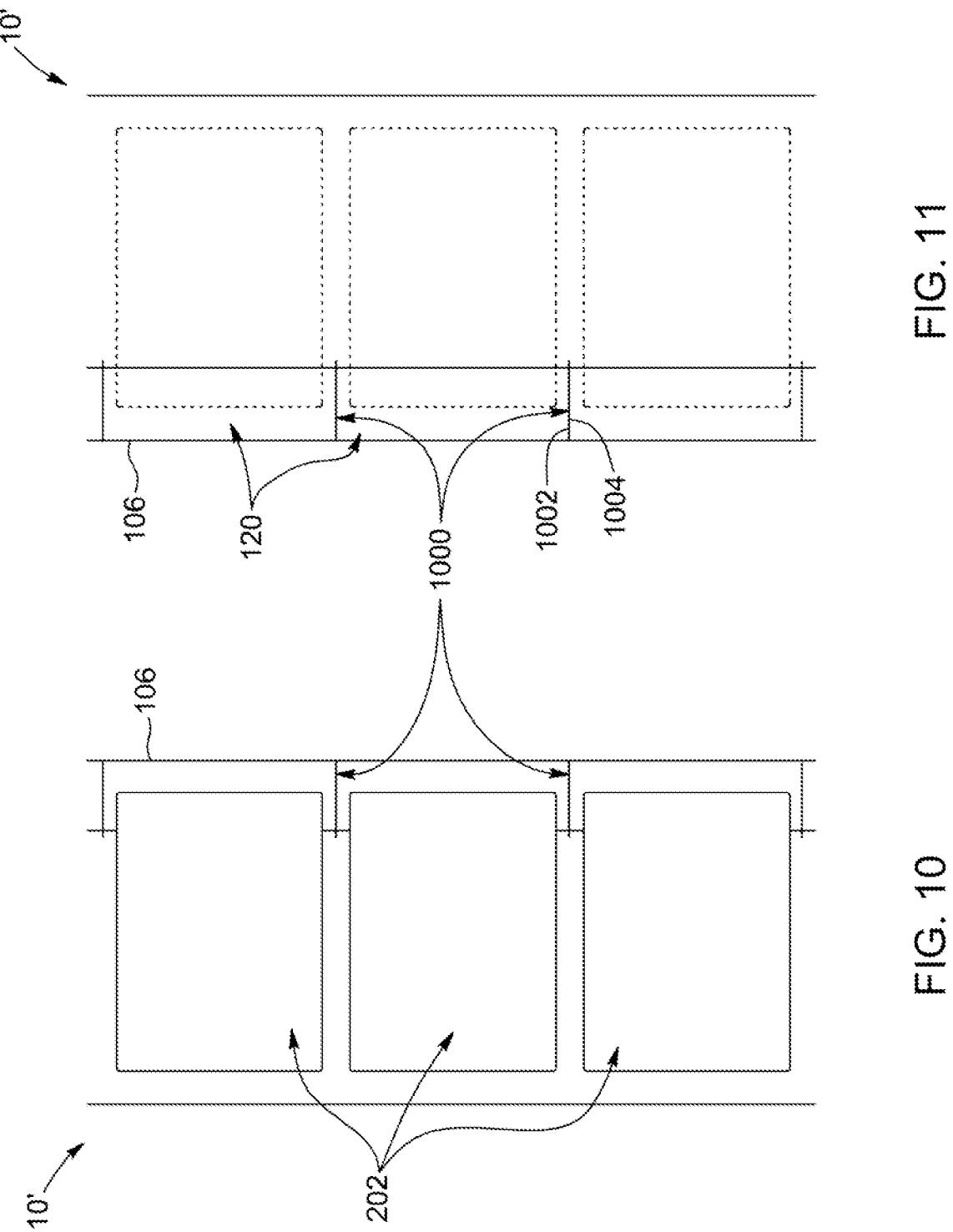
FIG. 10 is a top plan view of a label assembly, in accordance with another implementation.
FIG. 11 is a bottom plan view of the label assembly of FIG. 10.

Turning to FIGS. 10 and 11, there is shown a label assembly (101, in accordance with yet another implementation. This implementation is substantially similar to the implementation illustrated in FIGS. 1 to 3, except that instead of comprising notches between adjacent removable liner portions (120), the label support liner (100) includes a plurality of slits (1000) extending between the adjacent removable liner portions (120) such that the adjacent removable liner portions (120) are contiguous to each other. Specifically, each slit (1000) extends generally perpendicularly to the first liner side edge (106) and includes first and second edges (1002, 1004) which extend along each other and contact each other. In this case, additional notches or markings on the label support liner (100) may be used to allow a sensor of a printer or any other device to detect a position of a label. Moreover, it is contemplated that mirroring cuts could be provided on both sides of the label assembly (10′) (i.e. substantially similarly to the implementation shown in FIGS. 8 and 9 but with cuts instead of notches).

Figure 13:
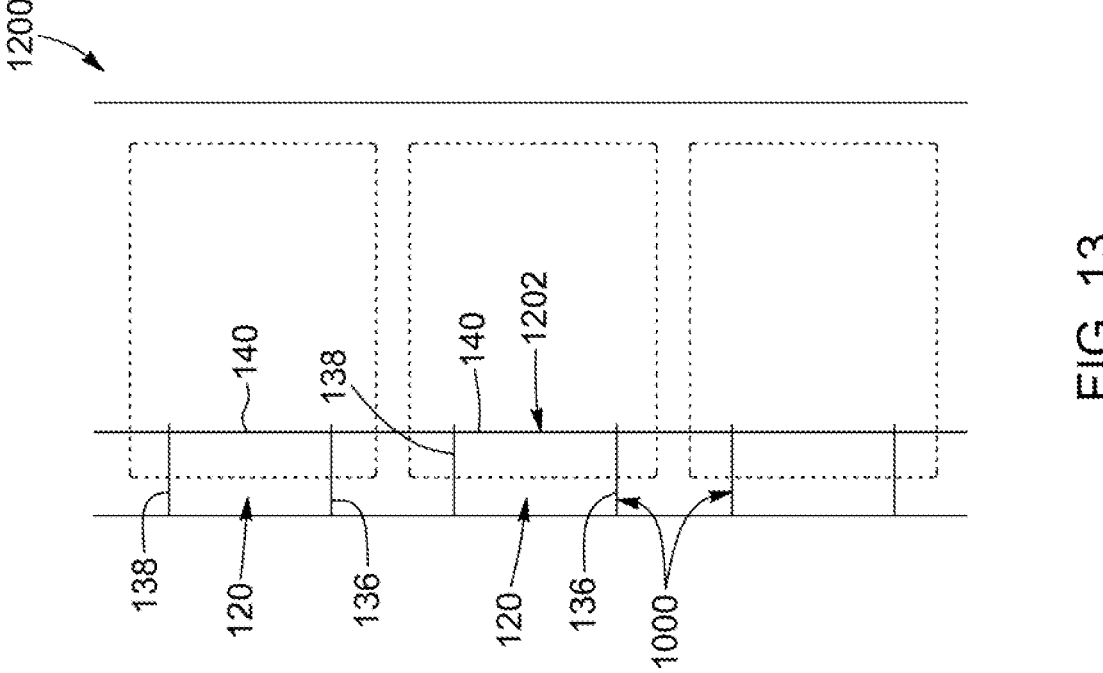
FIG. 13 is a bottom plan view of the label assembly of FIG. 12.
Figure 12:
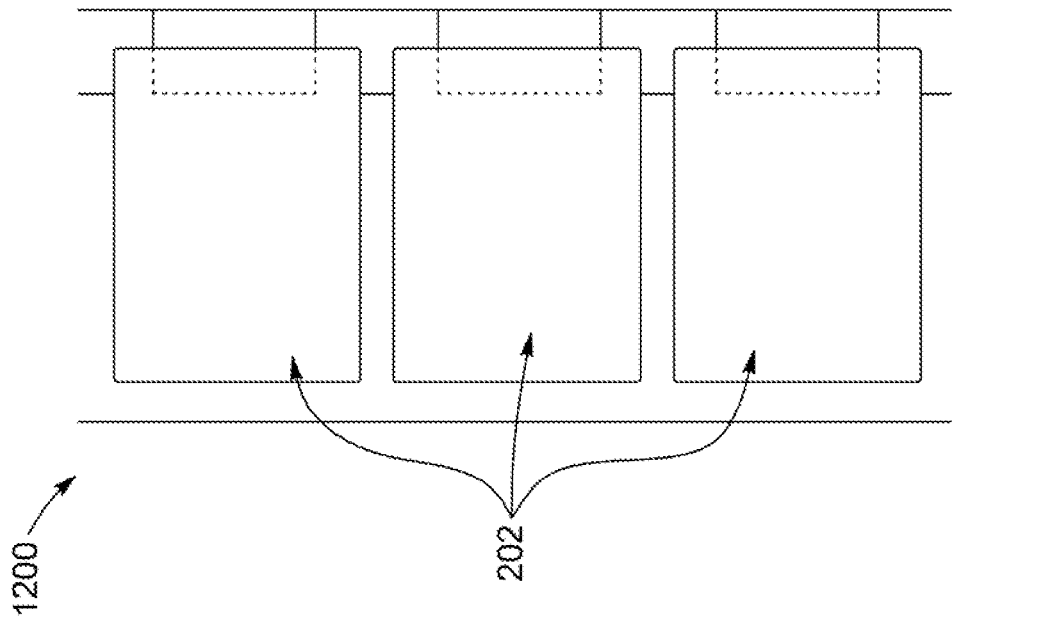
FIG. 12 is a top plan view of a label assembly, in accordance with another implementation.
Figure 15:
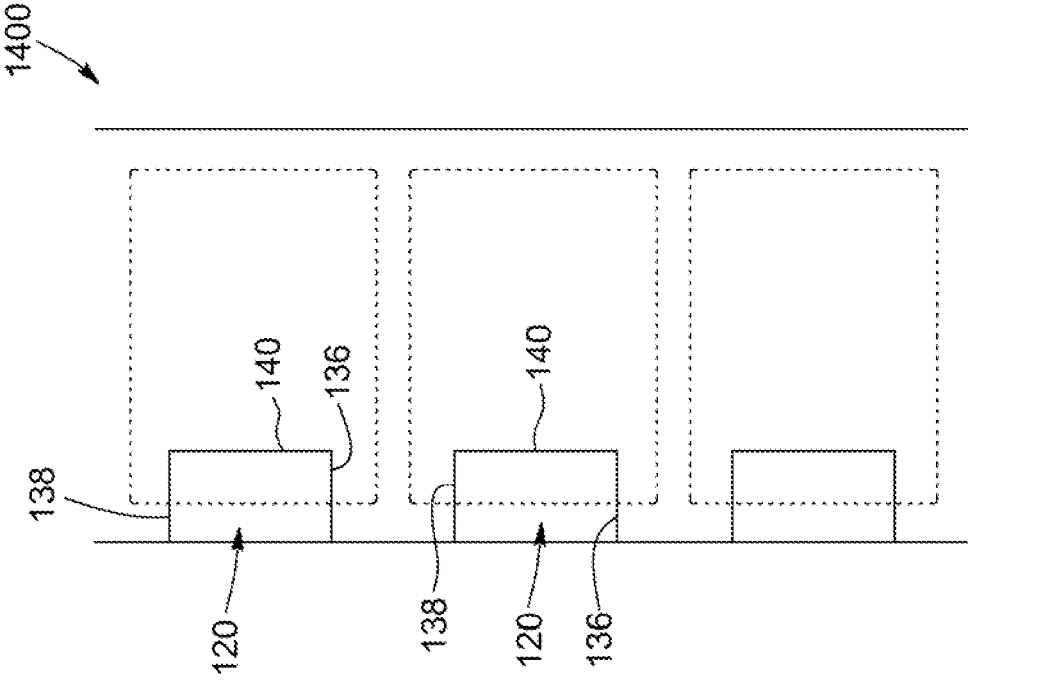
FIG. 15 is a bottom plan view of the label assembly of FIG. 14.
Figure 14:
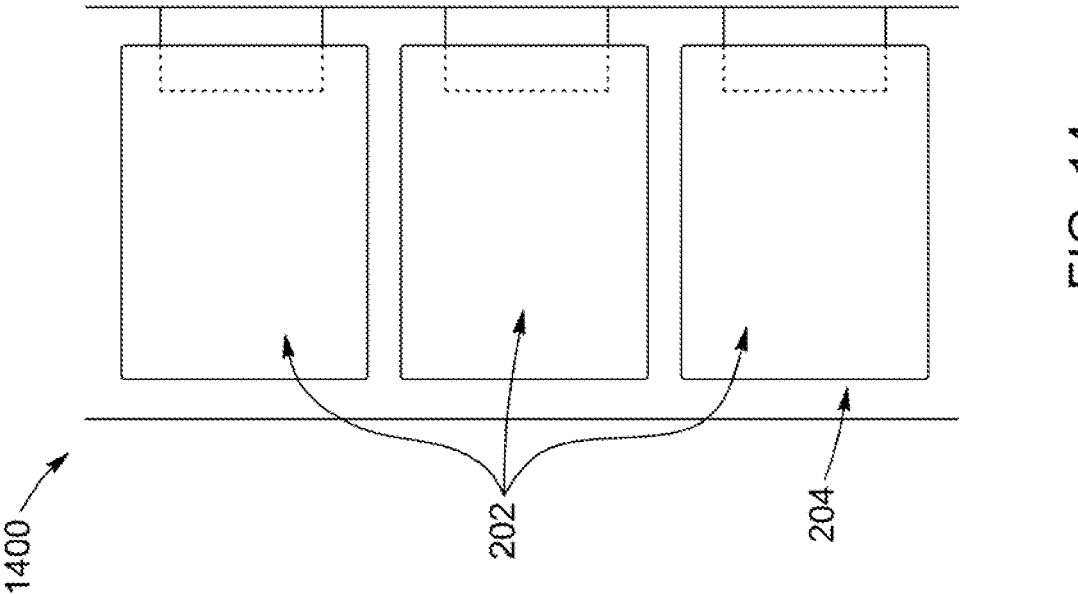
FIG. 14 is a top plan view of a label assembly, in accordance with another implementation.

Referring now to FIGS. 12 and 13, there is shown a label assembly (1200), in accordance with yet another implementation. This implementation is substantially similar to the implementation illustrated in FIGS. 10 and 11. While in the implementation of FIGS. 10 and 11, the slits (1000) were defining both the first cut line portion (136) of a removable liner portion (120) and a second cut line portion (138) of an adjacent removable liner portion (120), in this implementation, the height of the removable liner portions (120) in this implementation is smaller than the height of the label (202) such that the removable liner portions (120) are no longer adjacent to each other. As shown in FIG. 13, in this implementation, the third cut line portions (140) of all the removable liner portions (120) is formed by a single cut line (1202) which extends continuously along the label assembly (1200) in a longitudinal direction. FIGS. 14 and 15 show another implementation of the label assembly (1200′) which is similar to the implementation of FIGS. 12 and 13, except that the third cut line portions (140) are discrete in this case and do not extend beyond the first and second cut line portions (136, 138).

Figures 16, 17:
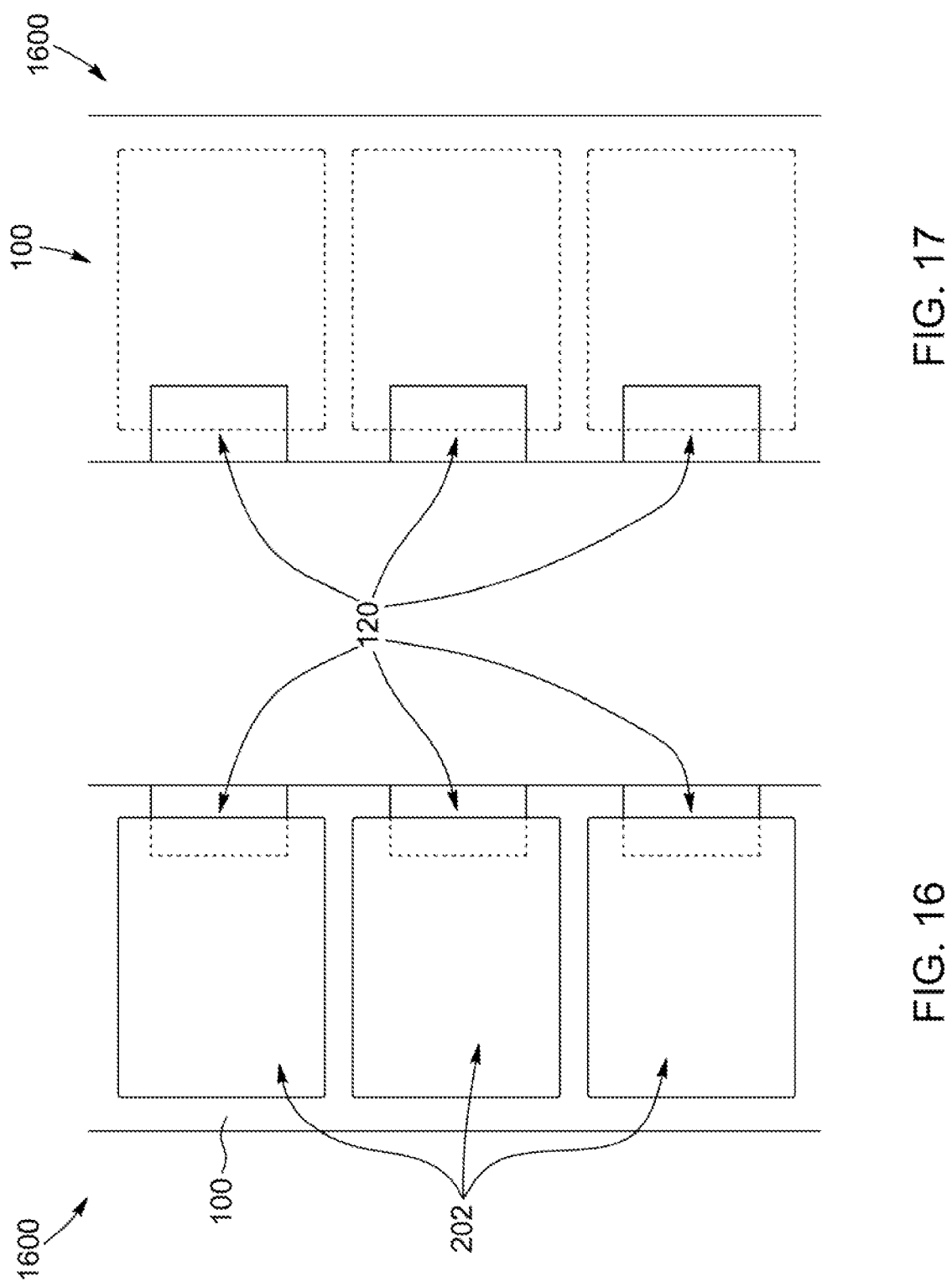
FIG. 16 is a top plan view of a label assembly, in accordance with another implementation.
FIG. 17 is a bottom plan view of the label assembly of FIG. 16.

Turning to FIGS. 16 and 17, there is shown a label assembly (1600), in accordance with yet another implementation. This implementation is substantially similar to the implementation illustrated in FIGS. 14 and 15, except that the label assembly (1600) is provided to the user without a waste portion (204). In other words, the label layer (200) includes only the labels (202) releasably affixed to the label support liner (100). In some circumstances, this may facilitate the manipulation of the labels (202) using the removable liner portions (120).

It will be understood that although the cut lines shown in FIGS. 14-17 are rectangular in shape with straight angles, the cut lines could instead have any other shapes under any angles, including rounded corners, including, but not limited to, a rectangular shape, a square shape, a semi-circular or circular shape, a semi-oval or oval-like shape, a triangular shape, a trapezoid-like shape, a rhombus-like shape, a polygonal shape (e.g. pentagonal, hexagonal, heptagonal, octagonal, nonagonal, decagonal, etc.), hybrid shapes, any symmetric or asymmetric or atypical or free-hand designed shapes, combined or fused shapes or any combination thereof. Furthermore, the cut lines shown in FIGS. 14-17 can also have a height substantially equal or substantially greater than the height of the label (202).

Figure 19:
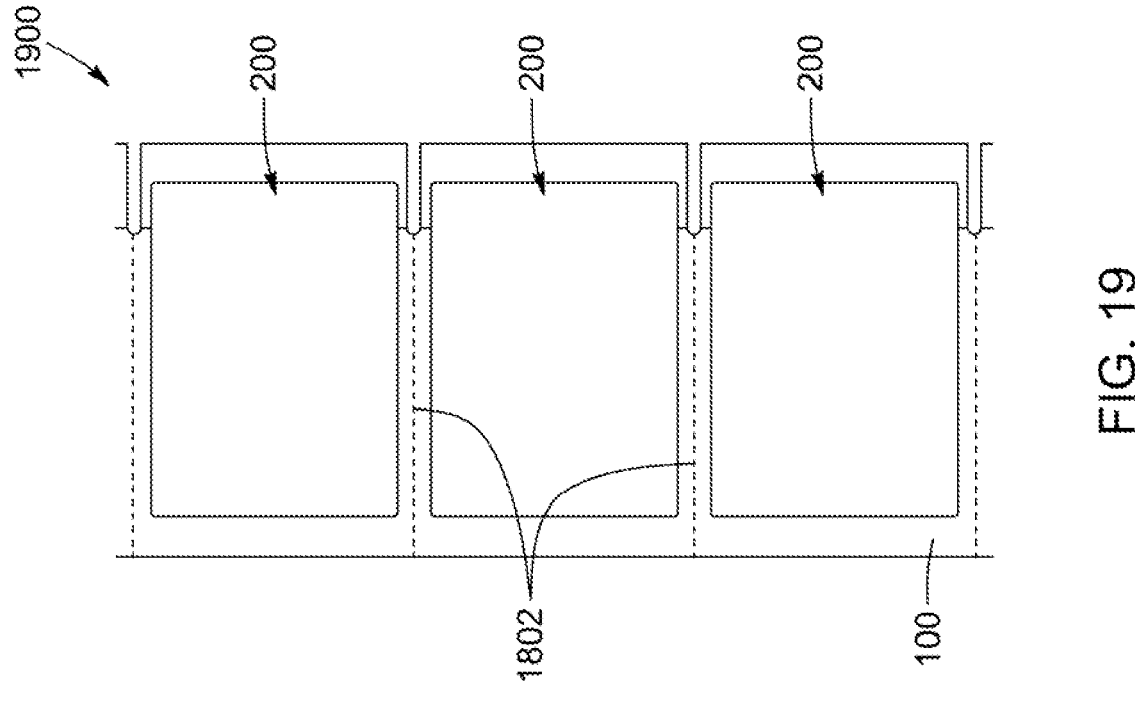
FIG. 19 is a bottom plan view of the label assembly of FIG. 18.
Figure 18:
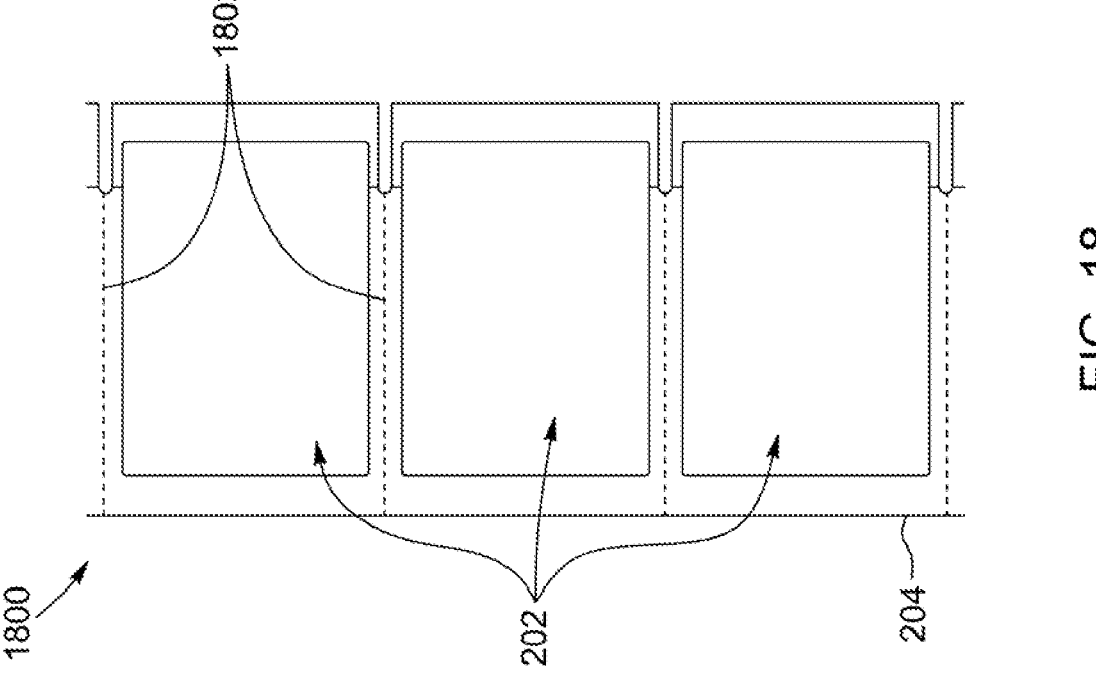
FIG. 18 a top plan view of a label assembly, in accordance with another implementation.

Referring now to FIG. 18, there is shown a label assembly (1800), in accordance with yet another implementation. This implementation is substantially similar to the implementation illustrated in FIGS. 1 to 3, except that the label assembly (1600) further includes a plurality of tear lines (1802) extending between adjacent labels (202) and adjacent removable liner portions (120). The term "tear line" as used herein refers to a line in which the material has been weakened, for example by providing spaced-apart perforations or relatively small cuts in the label assembly (1600) along the tear line. This implementation facilitates the separation of the label assembly (1600) into finite pieces of label assembly (1600) having a certain length and containing a certain number of labels (202), which, in some circumstances, may be more practical than using the entire label roll or using scissors or other tools to separate label sections from each other. FIG. 19 shows another implementation which is substantially similar to the implementation of FIG. 18, but in which the label assembly (1900) is provided to the user without a waste portion (204) such that the label layer (200) includes only the labels (202) releasably affixed to the label support liner (100).

Figure 20:
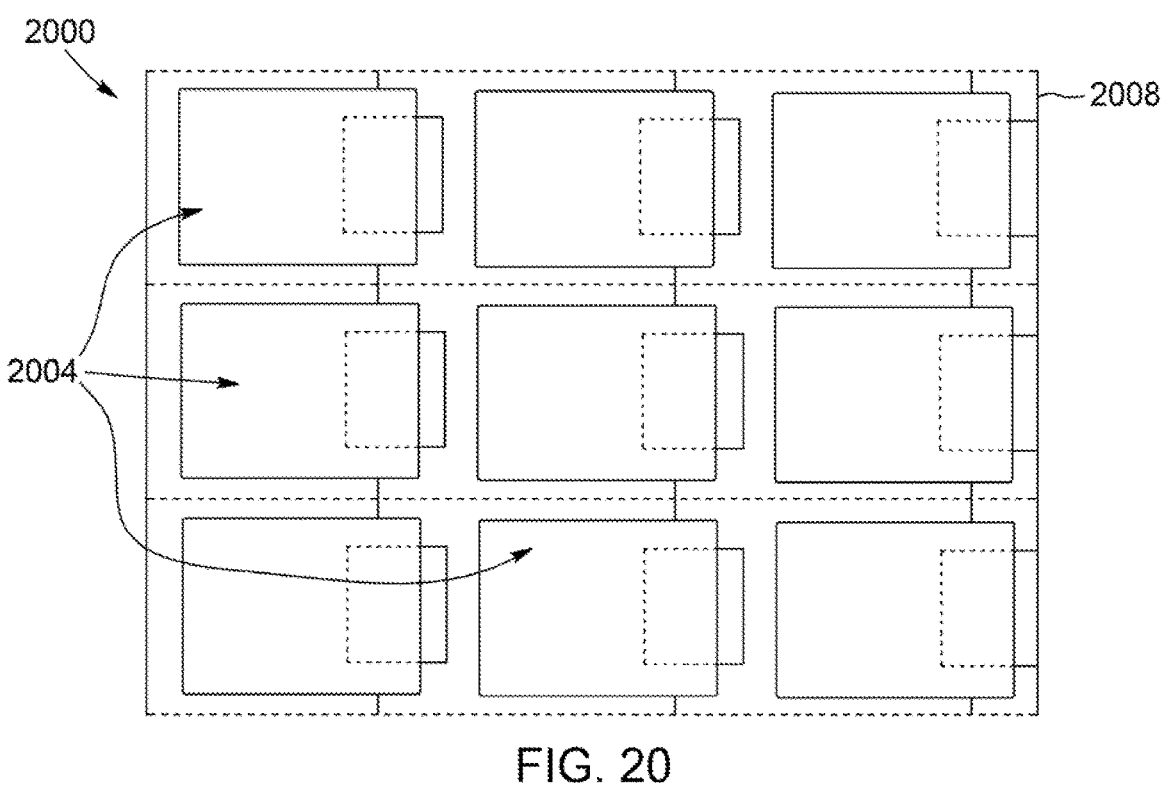
FIG. 20 is a top plan view of a label assembly, in accordance with another implementation.
Figure 21:
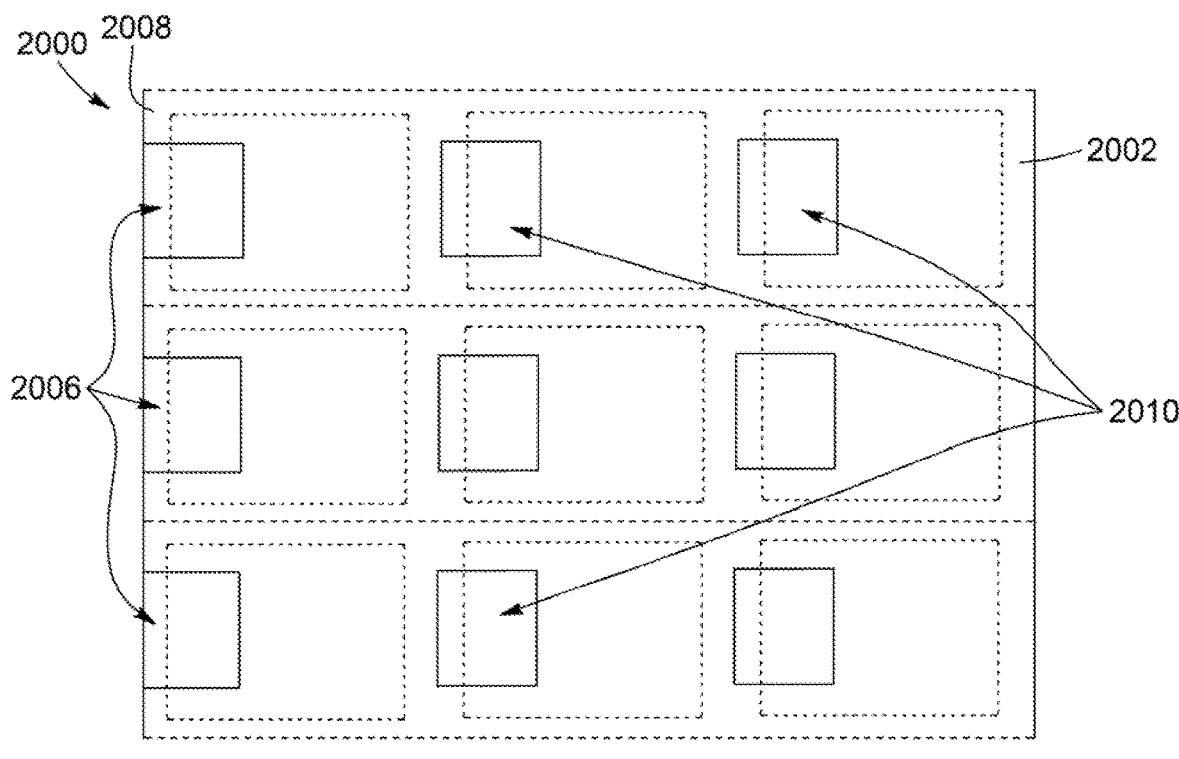
FIG. 21 is a bottom plan view of the label assembly of FIG. 20.
Figure 22:
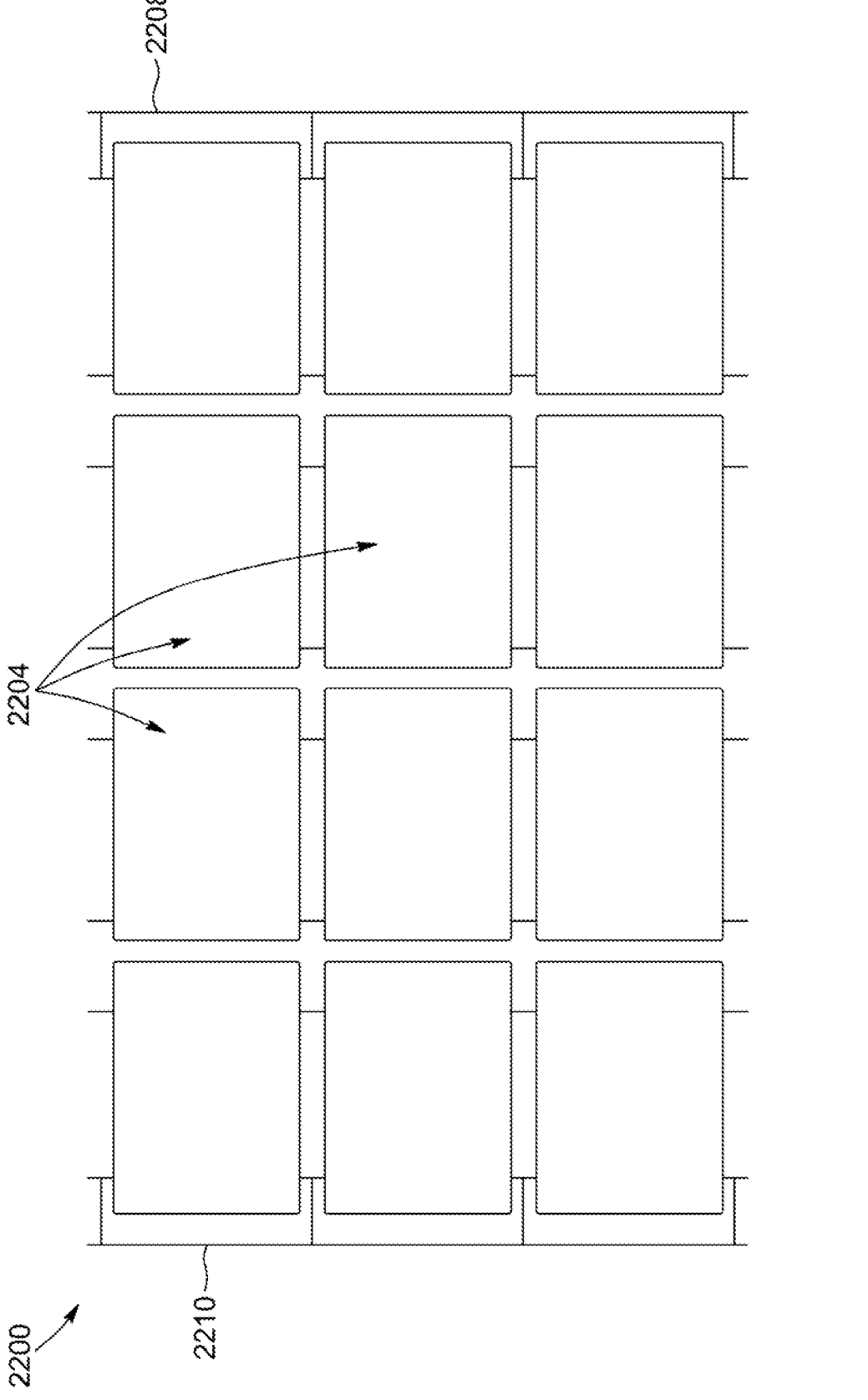
FIG. 22 is a top plan view of a label assembly, in accordance with another implementation.
Figure 23:
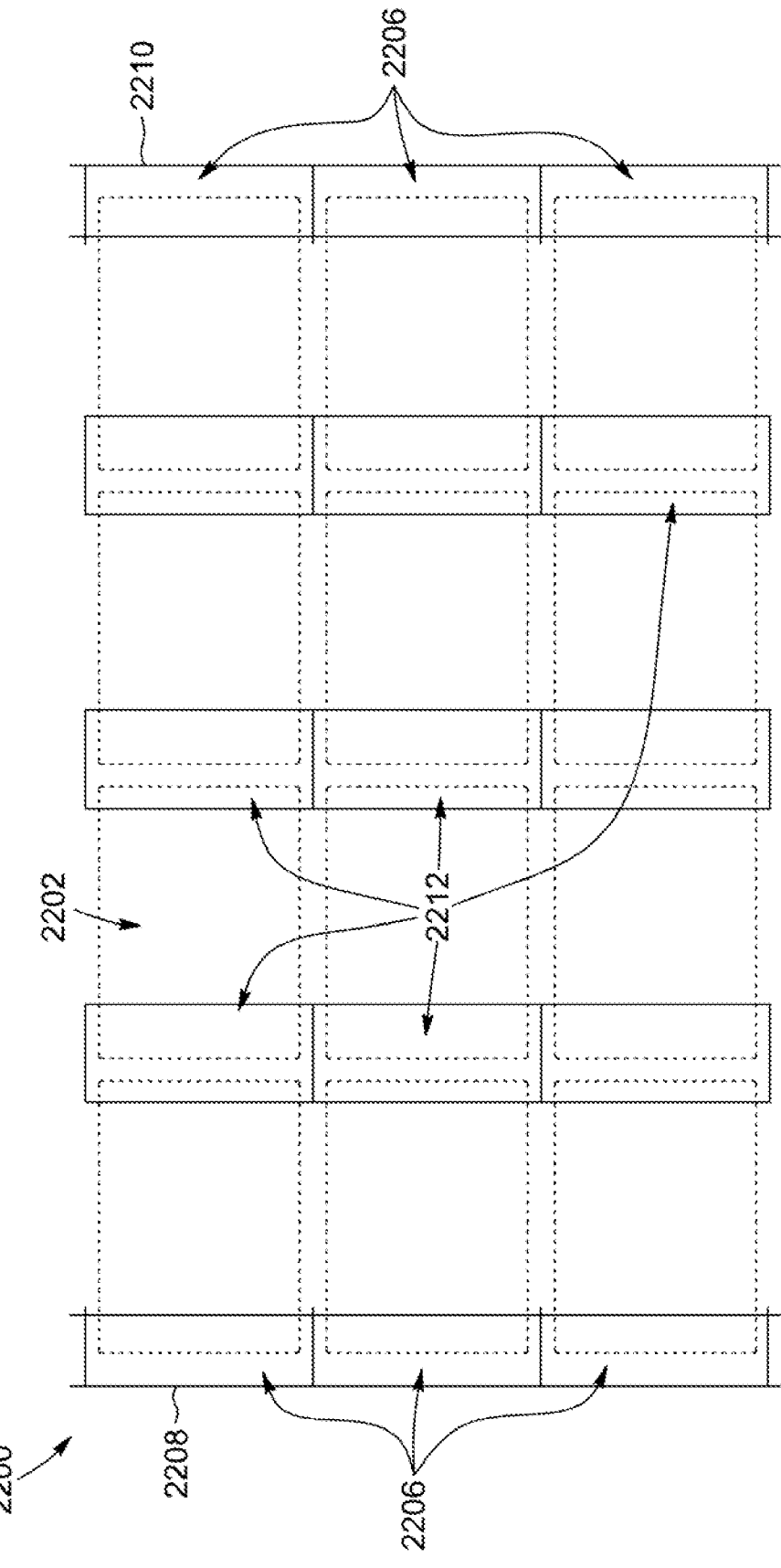
FIG. 23 is a bottom plan view of the label assembly of FIG. 22.
Figure 24:
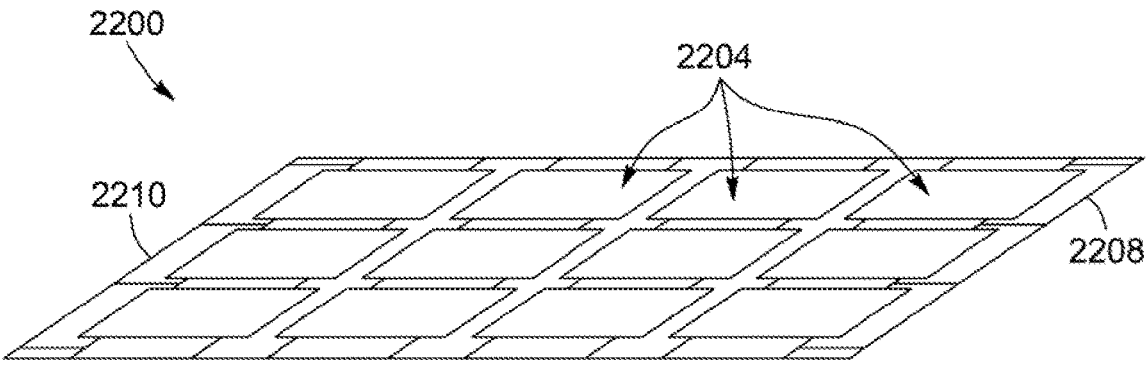
FIG. 24 is a top perspective view of the label assembly of FIG. 22, showing the labels being fully affixed to the label support liner.

Referring now to FIGS. 20 and 21, there is shown a label assembly (2000), in accordance with yet another implementation. In this implementation, the label assembly (2000) is configured as a label sheet or as a segmented portion from a label roll. The label assembly (2000) further includes a label support liner (2002) and a plurality of labels (2004) releasably affixed to the liner (2002).

It will be understood that although the cut lines shown in FIGS. 20 and 21 are rectangular in shape with straight angles, the cut lines could instead have any other shapes under any angles, including rounded corners, including, but not limited to, a rectangular shape, a square shape, a semi-circular or circular shape, a semi-oval or oval-like shape, a triangular shape, a trapezoid-like shape, a rhombus-like shape, a polygonal shape (e.g. pentagonal, hexagonal, heptagonal, octagonal, nonagonal, decagonal, etc.), hybrid shapes, any symmetric or asymmetric or atypical or free-hand designed shapes, combined or fused shapes or any combination thereof. Furthermore, the cut lines shown in FIGS. 20 and 21 can also have a height substantially equal or substantially greater than the height of the labels (2004).

The liner (2002) includes a plurality of edge removable liner portions (2006) which are adjacent to a first liner side edge (2008) of the liner (2002) and which are generally similar to the removable liner portions (120) of the implementation of FIGS. 1 to 3. The liner further includes a plurality of central removable liner portions (2010) which are not adjacent to the first liner side edge (2008), but that are instead located away from all edges of the liner (2002). In this implementation, the central removable liner portions (2010) could be accessed for example by pressing the label assembly portion between the central removable liner portions (2010) and an adjacent removable liner portion and lifting the edge of the central removable liner portions (2010) to thereby easily peel the label with the attached removable liner portion (2010). The central removable liner portions (2010) can then be lifted and moved similarly to the edge removable liner portions (2006) to peel the corresponding label (2004) off the liner (2002). The liner (2002) could also be slightly bent by the user to cause a corner or an edge of the central removable liner portions (2010) to be raised above the rest of the label assembly (2000) so as to be grasped by the user. This implementation may be provided with or without a waste portion around or adjacent to the labels (2004). In implementations which include a waste portion, additional face-cuts in non-label area connecting to the label area may be used depending the label configuration to facilitate the lifting and pilling of the label. In another implementation, one or more notche(s) or marking(s) may be provided to allow detection of the label's position by a sensor from a printer or any other device.

Turning now to FIGS. 22 to 25, there is shown a label assembly (2200), in accordance with yet another implementation. In this implementation, the label assembly (2200) is also provided as a label sheet or label roll or fanfold or strip. The label assembly (2200) includes a label support liner (2202) and a plurality of labels (2204) releasably affixed to the liner (2202). Similarly to the implementation of FIGS. 20 and 21, the liner (2202) includes a plurality of edge removable liner portions (2206) located adjacent one of a first or second liner side edges (2208, 2210) of the liner (2202) and a plurality of central removable liner portions (2212) which are located away from all the edges of the liner (2202). In this implementation, each label (2204) overlaps at least two removable liner portions (2206 or 2212), similarly to the implementation of FIGS. 8 and 9, and each central removable liner portion (2212) is overlapped by two labels (2204). It is contemplated that the removable liner portions (2206 or 2212) can also be substantially equal or smaller than the height of the labels (2204) similar to the implementation of FIGS. 20 and 21.

Figure 25:
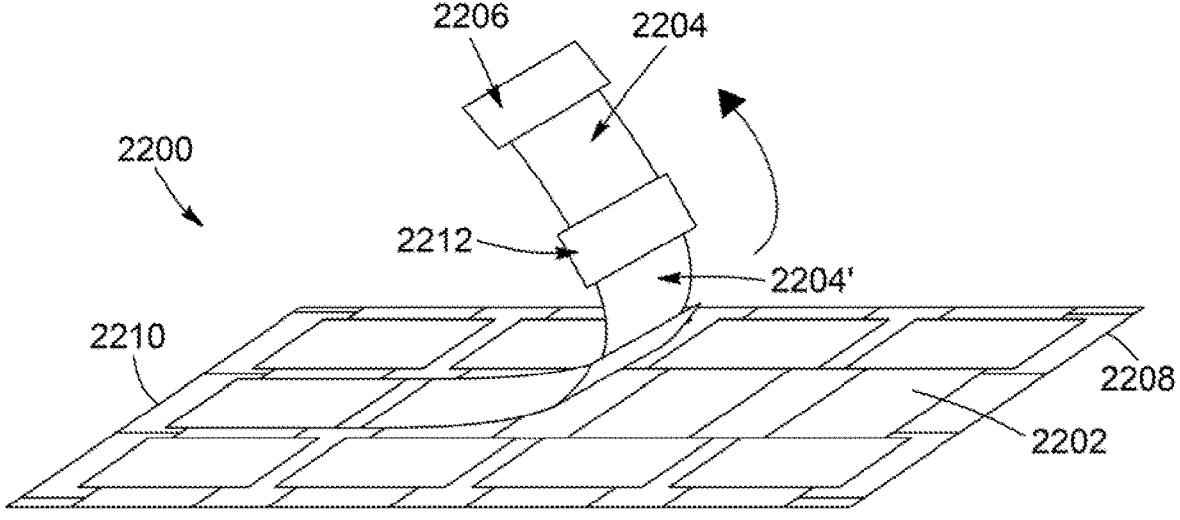
FIG. 25 is another top perspective view of the label assembly of FIG. 22, showing first and second removable liner portions being separated from the main liner portion and first and second labels overlapping the separated removable liner portions being peeled off from the main liner portion.

As shown in FIG. 25, when a label (2204) overlapping an edge removable liner portion (2206) is peeled off by separating the edge removable liner portion (2206), the central removable liner portion (2212) overlapped by the peeled-off label (2204) can also be separated from the liner (2202) and can also be used to peel off the other label (2204') overlapping the central removable liner portion (2212). In this configuration, the entire row of labels (2204) can be peeled off using only the edge removable liner portion (2206), if desired.

It will be understood that in the implementation illustrated in FIGS. 22 to 25, whether a single label or multiple labels are peeled at once, as shown in FIG. 25, can be controlled based on one or more of the following characteristics of the label assembly (2200): the size of the label area (2204) overlapping the central removable liner portion (2212), the ratio between the size of the central removable liner portion (2212) and the size of the overlapping portion of label (2204), the physical dimensions and shape of the central removable liner portion (2212), the physical characteristics of the facestock, the adhesive's strength, the type of adhesive used, the release level or degree of the release coating (which could be defined by the amount of silicone in the release coating, for example) on the central removable liner portion, and the releasability of the adhesive from the release coating.

Figure 27:
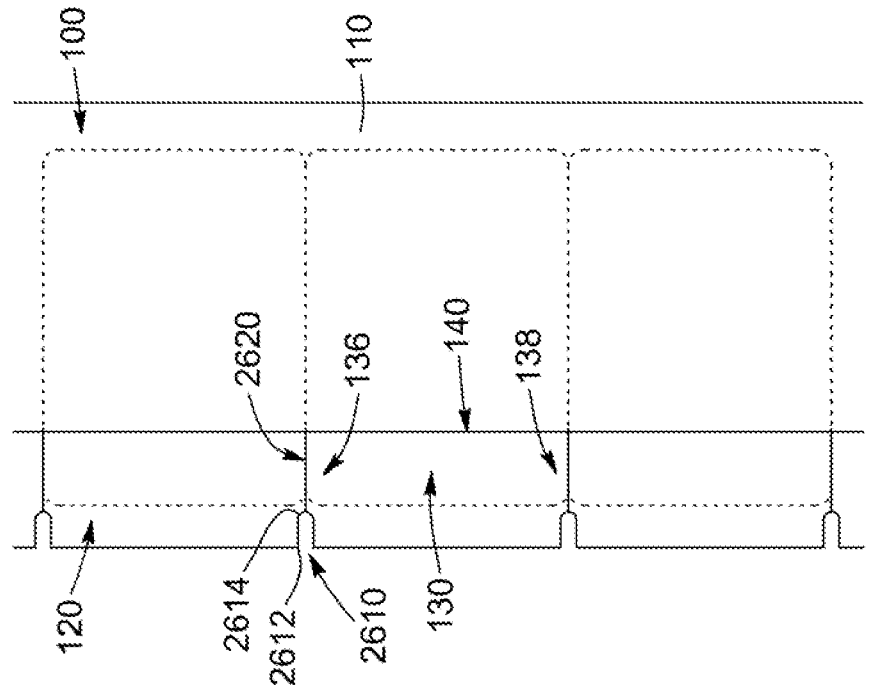
FIG. 27 is a bottom plan view of the label assembly of FIG. 26.
Figure 26:
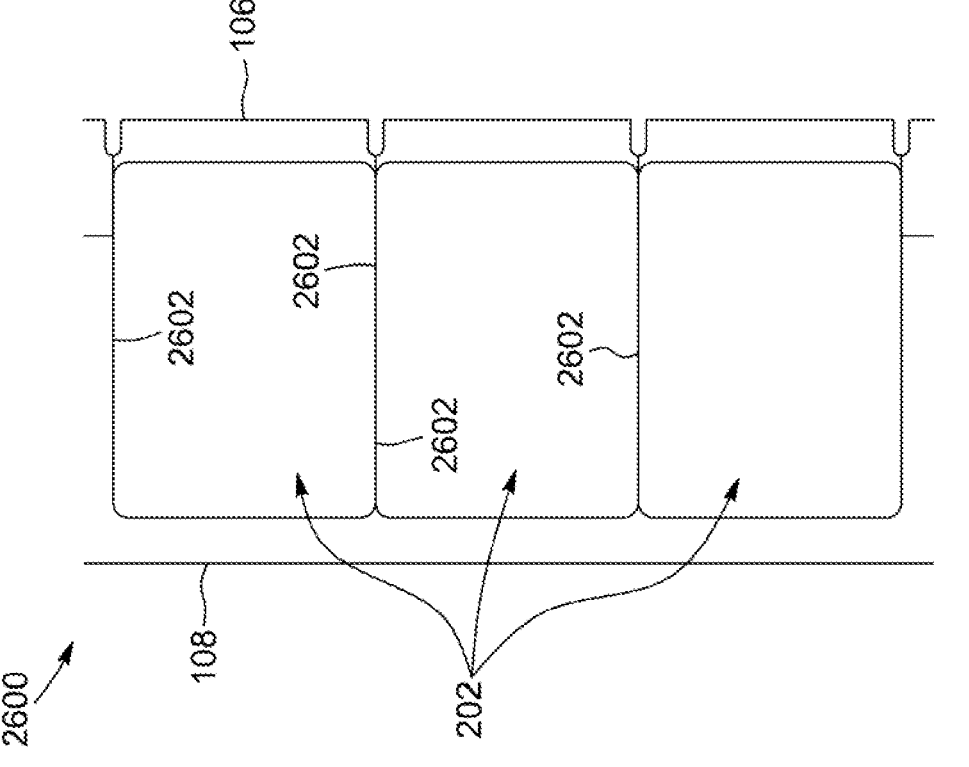
FIG. 26 is a top plan view of a label assembly, in accordance with another implementation.

Turning to FIG. 26, there is shown a label assembly (2600), in accordance with another implementation. This implementation is substantially similar to the implementation illustrated in FIGS. 1 to 3, except that instead of the labels (202) being spaced from each other, the labels (202) are contiguous to each other. In other words, each label (202) includes a pair of lateral label edges (2602) extending substantially perpendicular to the first and second liner side edges (106, 108), and the labels (202) are positioned such that at least one of the lateral label edge (2602) extends along one of the label lateral edges (2602) of an adjacent label (202). Moreover, each one of the first and second linear cut line portions (136, 138) of the liner cut lines (130) delimiting the removable liner portions (120) is substantially aligned with the lateral label edges (2602), as shown in FIG. 27, such that each label (202) overlap only one of the removable liner portions (120).

Still in this embodiment, instead of comprising only notches between adjacent removable liner portions (120) as in the implementation shown in FIGS. 1 to 3 or only slits as in the implementation shown in FIGS. 10 and 11, each one of the first and second linear cut line portions (136, 138) includes both a notch section (2610) and a slit section (2620). Specifically, the notch section (2610) extends between a first notch end (2612) located at the first liner side edge (106) and a second notch end (2614) located towards the second liner side edge (108). The slit section (2620) forms an extension of the notch section (2610) towards the second liner side edge (108) and extends between the second notch end (2614) and the third linear cut line portion (140) which extends between the first and second linear cut line portions (136, 138). It will be understood that the notch sections (2610) may have substantially the same function as the notches (142) illustrated in FIGS. 2 and 3 and provide an indication of a position of the labels (202) on the label assembly (10). For example, the notch sections (2610) may be detected by an optical detector such as the optical detector of a printer or any other device to allow the printer to ensure that the inscription to be printed on the label (202) is aligned with the label (202).

Figure 29:
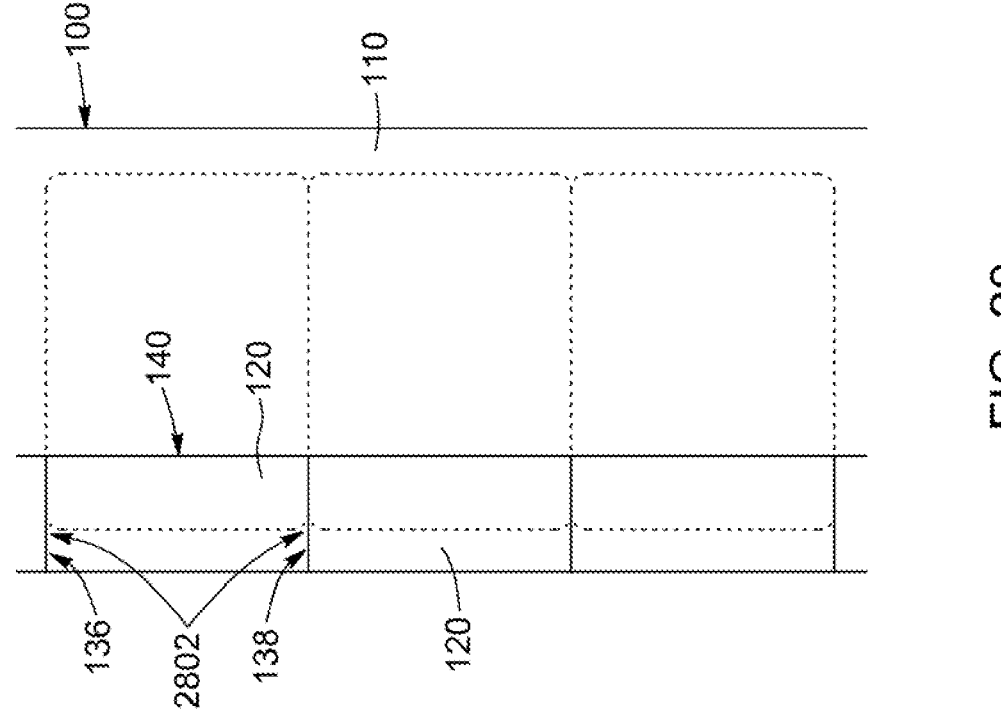
FIG. 29 is a bottom plan view of the label assembly of FIG. 28.
Figure 28:
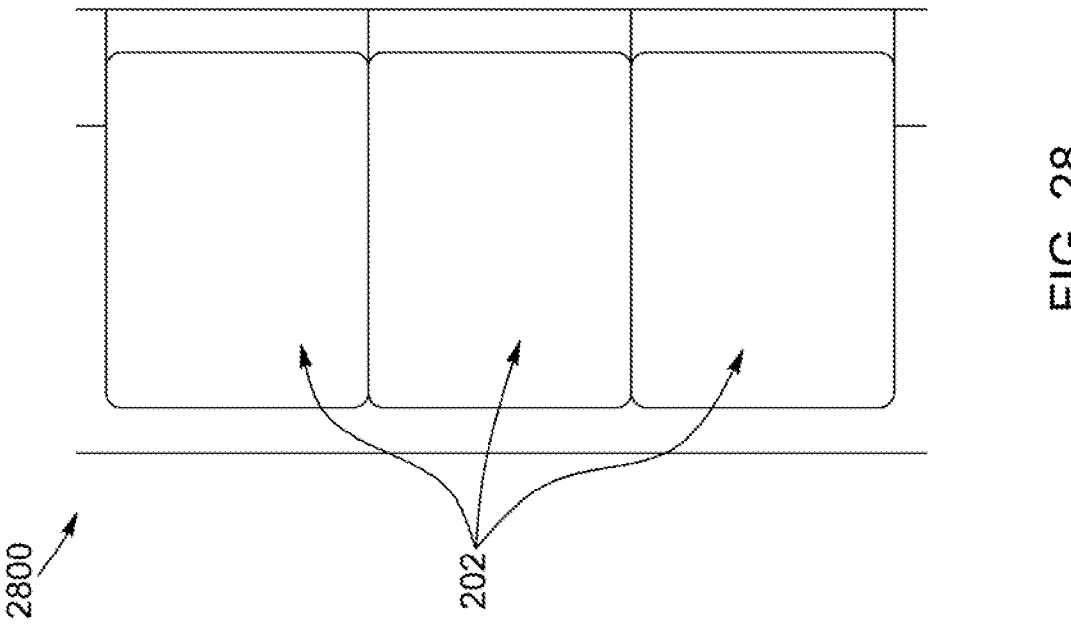
FIG. 28 is a top plan view of a label assembly, in accordance with another implementation.

Referring now to FIGS. 28 and 29, there is shown a label assembly (2800), in accordance with yet another implementation. This implementation is substantially similar to the implementation illustrated in FIGS. 26 and 27. Specifically, the labels (202) are contiguous to each other instead of being spaced from each other. However, instead of the first and second linear cut line portions (136, 138) comprising notch and slit sections, each one of the first and second linear cut line portions (136, 138) defined in the label support liner (100) is a slit (2802) along its entire length between the first liner side edge (106) and the third linear cut line portion (140), similar to the slit (1000) described above in relation with the implementation of FIGS. 10 and 11.

Figure 30:
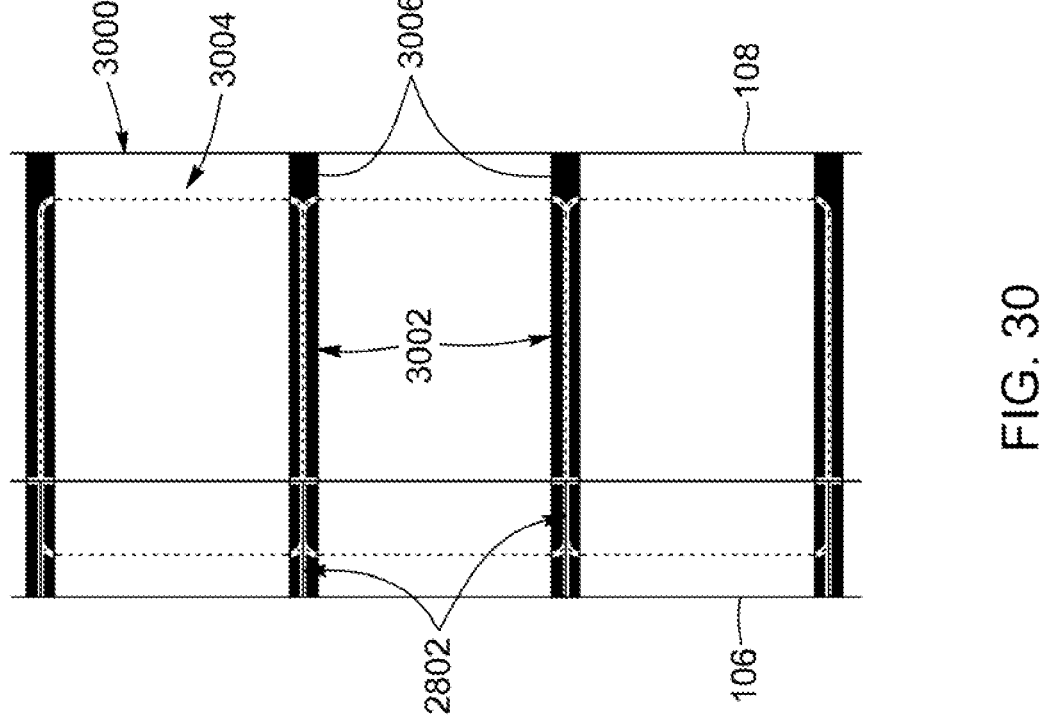
FIG. 30 is a is a bottom plan view of a liner for the label assembly of FIG. 28, in accordance with an alternative implementation.

FIG. 30 shows a liner (3000) for the label assembly illustrated in FIGS. 28 and 29, in accordance with another implementation. The liner (3000) is substantially similar to the label support liner (100) illustrated in FIG. 29 and includes the slits (2802) extending between adjacent labels (202). In this embodiment, the liner (3000) further includes a plurality of label position indicators (3002) defined on a bottom liner face (3004) of the label support liner (100) opposite the labels (200). Specifically, each label position indicator (3002) includes a printed marking, and more specifically a printed line (3006) which is substantially aligned with a corresponding slit (2802) and which extends from the first liner edge (106) to the second liner edge (108). In the implementation illustrated in FIG. 30, the printed lines (3006) extend substantially perpendicular to the first and second liner side edges (106, 108) but alternatively, the printed lines (3006) could be angled relative to the first and second liner side edges (106, 108) and/or may not extend along an entire width of the label support liner (100). For example, the printed lines (3006) may extend from one of the first and second liner side edges (106, 108) and only partially towards the other one of the first and second liner side edges (106, 108), or may not even extend to one of the first and second liner side edges (106, 108). Moreover, the printed lines (3006) may all have the same length and/or thickness or may have different lengths and/or thickness.

It will be understood that by being aligned with the slits (2802) extending between adjacent labels (202), the printed lines (3006) provide an indication of a position of the labels (202) on the label assembly (10), similarly to the notches (142) illustrated in FIGS. 2 and 3. In some implementations, depending on the specifications of the printing device, encoding device or any other device used, the lines or markings might not be aligned with the slits or notches in the label support liner (100) and could instead be offset at any distance from the slits and/or notches.

The printed line (3006) may include a specific color or texture, a contrasting tone relative to the rest of the bottom liner face (3004), may be made of a reflective substance or of a substance having a suitable composition such as a water-based ink, UV ink, solvent based ink or any other appropriate ink to allow or facilitate its detection by an optical detector of a printer or any other device. Alternatively, instead of including printed lines, the label position indicators (3002) could include any other type of marking such as a complete line, partial line, square, rectangle and/or any other geometrical shape(s) or configuration(s) which could be positioned anywhere on the label support liner (100) which could provide the printer with an indication of the position of the labels (202). In some implementations, these printed position indicators could be combined with a notch or notches as described above, depending on the printer specifications. Printing of other indicia, text, serial numbers, barcodes, logos, alphanumeric information or graphic images or the like on the liner is also contemplated.

It will be understood that the use of position indicators such as printed markings or a combination of one or more printing markings and one or more notches on the label support liner (100) is not limited to the implementation illustrated in FIG. 30 and could be provided in any other implementation of the label assembly.

Figure 32:
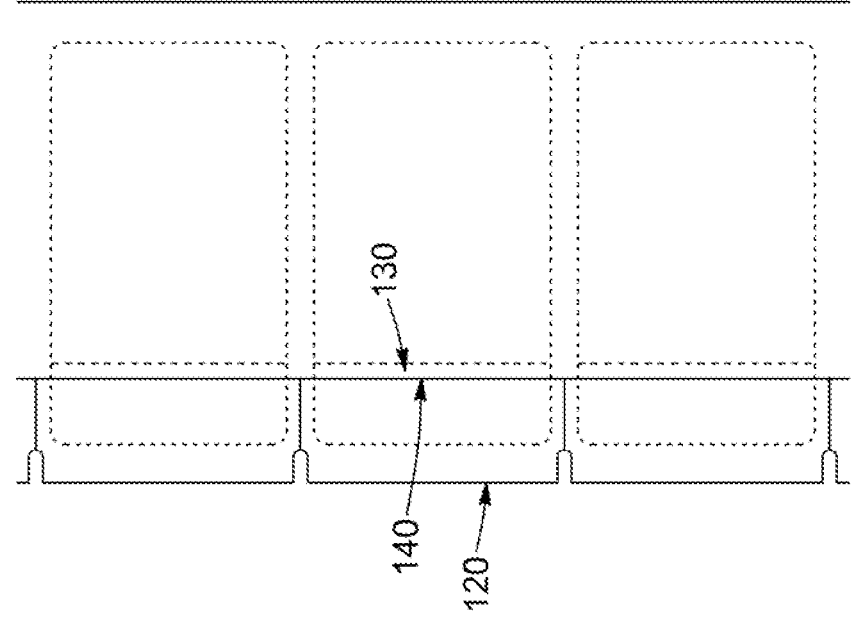
FIG. 32 is a bottom plan view of the label assembly of FIG. 31.
Figure 31:
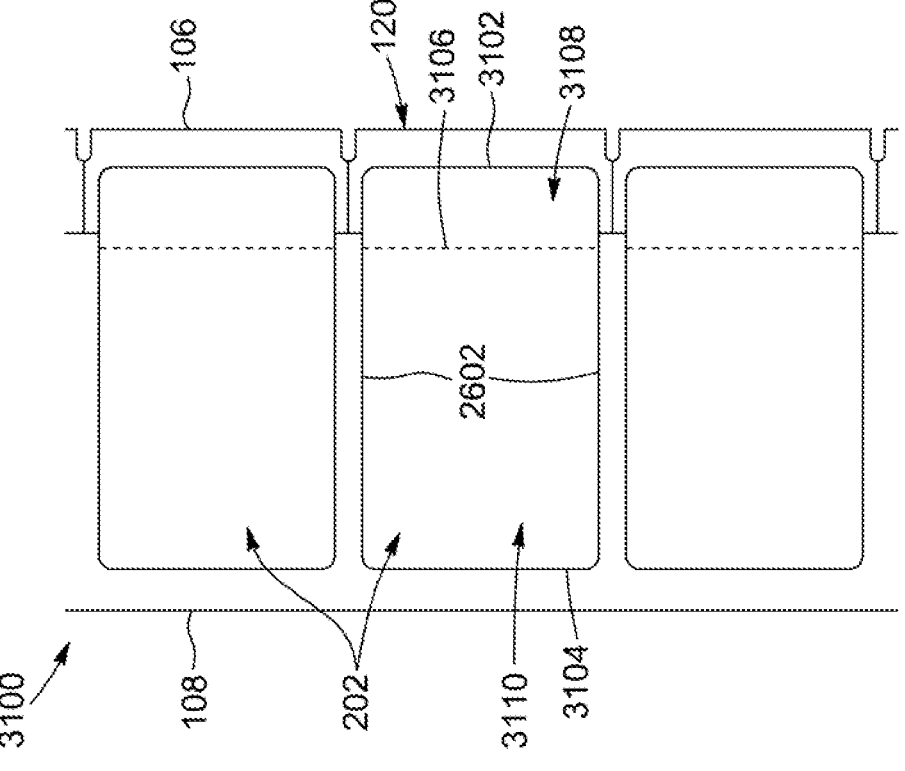
FIG. 31 is a top plan view of a label assembly, in accordance with another implementation.

Referring now to FIGS. 31 and 32, there is shown a label assembly (3100), in accordance with yet another implementation. This implementation is substantially similar to the implementation illustrated in FIGS. 26 and 27, except that the labels (202) are spaced from each other as in the implementation shown in FIGS. 1 to 3 rather than being contiguous to each other.

Moreover, in this implementation, each label (202) includes a first label end (3102) positioned towards the first liner side edge (106) and a second label end (3104) positioned towards the second liner side edge (108). The label (202) further includes a label tear line (3106) which divides the label (202) into a first label section (3108) located towards the first liner side edge (106) and a second label section (3110) located towards the second liner side edge (108). Specifically, the label tear line (3106) extends between the lateral label edges (2602) of the label (202) along the entire height of the label (202) and extends generally parallel to the first liner side edge (106). The label tear line (3106) allows the first label section (3108) to be separated from the second label section (3110) once the label (202) has been removed from the liner (100) such that only the second label section (3110) may be affixed to a surface, as will be explained further below.

In the illustrated implementation, the label tear line (3106) is not aligned with the third linear cut line portion (140) of the liner cut line (130) delimiting the removable liner portions (120), but is instead offset or spaced from the third linear cut line portion (140) towards the second liner side edge (108). This configuration may contribute to preventing the accidental separation of the first and second label sections (3108, 3110) along the label tear line (3106) when the removable liner portion (120) is separated from the main liner portion (110). Alternatively, the label tear line (3106) may be aligned with the third linear cut line portion (140).

Turning now to FIGS. 33A to 33E, there is shown a method for affixing the label (202) to a surface such as the outer container surface (60) of the container (62) using the label assembly (3100), in accordance with one implementation of the method.

Figure 33B:
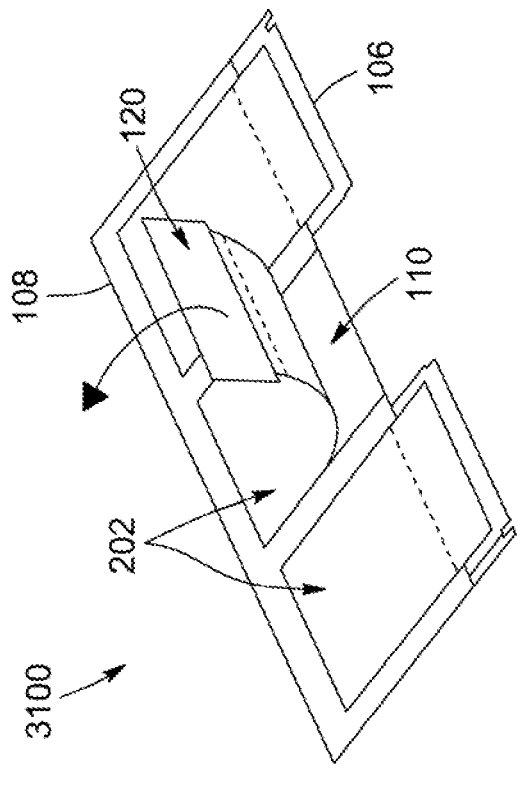
FIG. 33B is another perspective view of a portion of the label assembly of FIG. 31, with a removable liner portion of the label support liner separated from a main liner portion of the label support liner and a corresponding one of the label overlapping the separated removable liner portion being peeled off from the main liner portion.
Figure 33A:
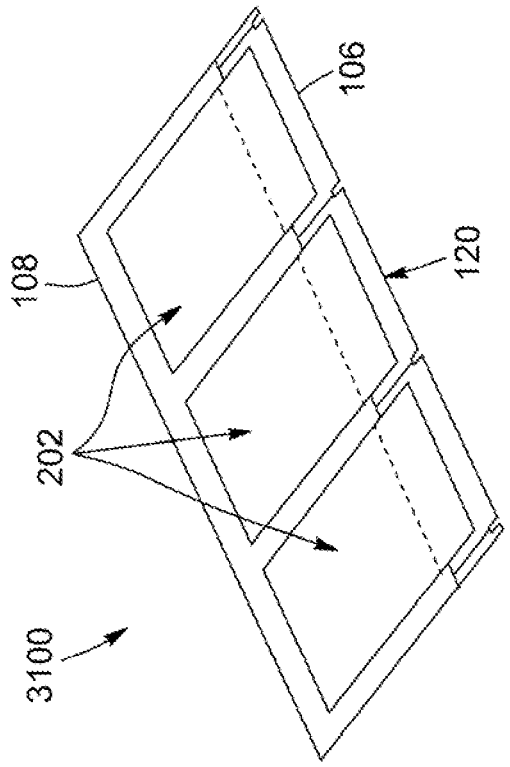
FIG. 33A is a perspective view of a portion of the label assembly of FIG. 31, with labels affixed to the label support liner.

As shown in FIG. 33A, the label assembly (3100) is first provided. As shown in FIG. 33B, the removable liner portion (120) is then separated from the main liner portion (110) and is moved away from the main liner portion (110), similarly to the step of the method illustrated in FIG. 5B.

As shown in FIG. 33C, the second label section (3110) is then affixed to the outer container surface (60). In the implementation illustrated in FIG. 33C, the second label end (3104) is affixed to the outer container surface (60) and the rest of the second label section (3110) is then affixed to the outer container surface (60) gradually from the second label end (3104) towards the label tear line (3106). Since the outer container surface (60) is cylindrical in the illustrated implementation, this could be accomplished by rotating the container (62) about a longitudinal axis of the container (62), for example. Alternatively, the second label section (3110) could be affixed to the outer container surface (60) in any other suitable manner.

Once the second label section (3110) has been affixed to the outer container surface (60) up to or substantially close to the label tear line (3102), the first label section (3108) can be separated from the second label section (3110) by tearing the label (202) along the label tear line (3106), as shown in FIG. 33D. Since the second label section (3110) overlaps the removable liner portion (120), the removable liner portion (120) is also separated from the second label section (3110) when the label (202) is torn along the label tear line (3106).

It will be appreciated that the first label section (3108) could then be discarded along with the removable liner portion (120), or could be peeled off the removable liner portion (120) to be used independently from the second label section (3110). For example, the second label section (3110) could contain a first identifier such as an identification number and a first information such as information regarding a specimen which is to be collected in the container (62), and the first second label section (3108) could contain a second identifier which would allow the user to associate the first label section (3108) to the second label section (3110). For example, the second identifier could include the same identification number found on the first label section (3108). In this implementation, the first label section (3108) could further include a second information related to the first information such as information regarding the patient from which the specimen is to be collected, for example. Once the first label section (3108) has been removed from the removable liner portion (120), it could be affixed to another surface, such as a patient data sheet containing additional information regarding the patient, for example. Alternatively, the first and second label sections (3108) could include various other types of information and/or of identifiers.

Figure 35:
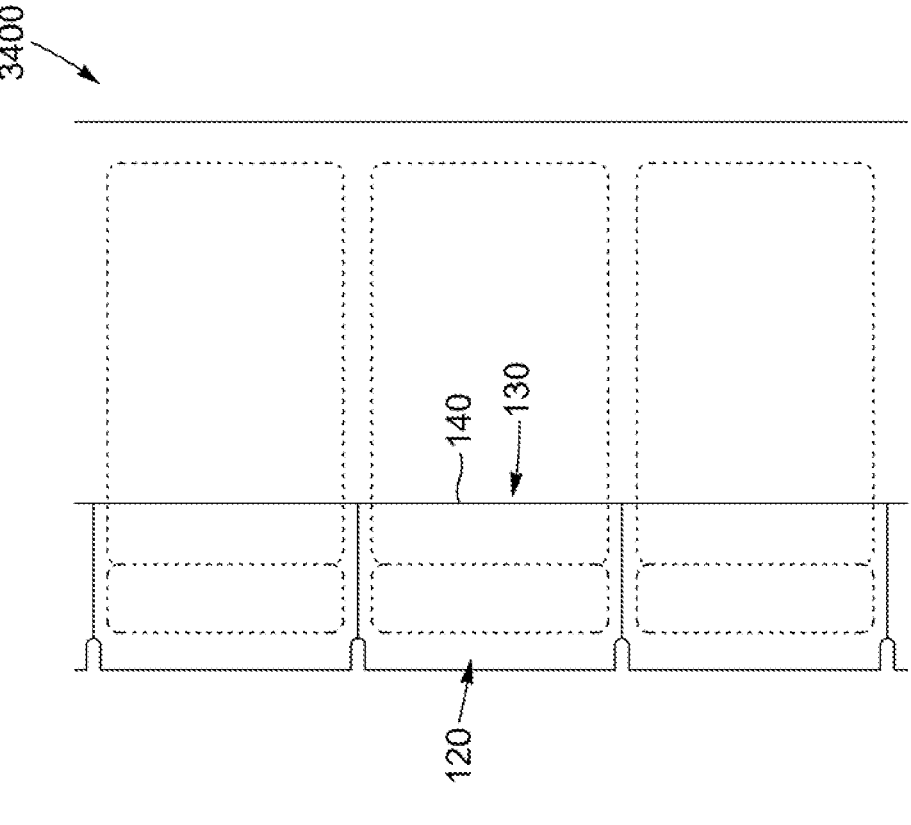
FIG. 35 is a bottom plan view of the label assembly of FIG. 31.
Figure 34:
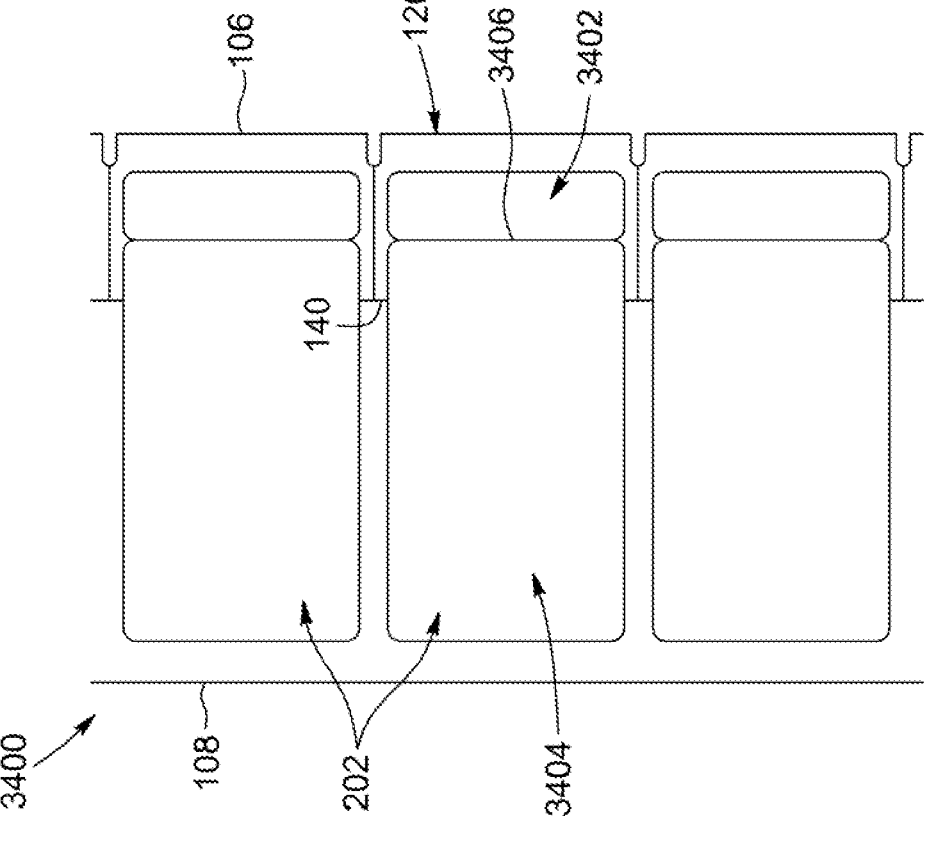
FIG. 34 is a top plan view of a label assembly, in accordance with another implementation.

Turning to FIGS. 34 and 35, there is shown a label assembly (3400), in accordance with yet another implementation. Similarly to the implementation illustrated in FIGS. 31 and 32, each label (202) includes a first label section (3402) positioned towards the first liner side edge (106) and a second label section (3404) positioned towards the second liner side edge (108). In this implementation, instead of being delimited from each other by a tear line, the label (202) includes a label cut line (3406) extending between the first and second label sections (3402, 3404). Specifically, the label cut line (3406) is substantially parallel to the first liner side edge (106) and extends along an entire height of the label (202) such that the first and second label sections (3402, 3404) are substantially distinct from each other. In this implementation, the label cut line (3406) is not aligned with the third linear cut line portion (140) of the liner cut line (130) delimiting the removable liner portions (120), but is instead offset or spaced from the third linear cut line portion (140) towards the first liner side edge (106). In this configuration, the first label section (3402) is entirely received on the removable liner portion (120) and the second label section (3404) overlaps the removable liner portion (120) and the main line portion (110).

Turning now to FIGS. 36A to 36E, there is shown a method for affixing the label (202) to a surface such as the outer container surface (60) of the container (62) using the label assembly (3400), in accordance with one implementation of the method.

Figure 36B:
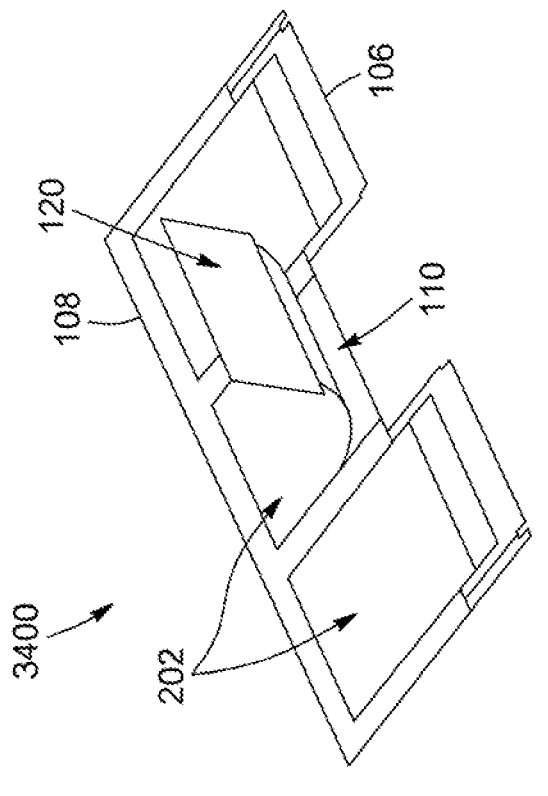
FIG. 36B is another perspective view of a portion of the label assembly of FIG. 34, with a removable liner portion of the label support liner separated from a main liner portion of the label support liner and a corresponding one of the label overlapping the separated removable liner portion being peeled off from the main liner portion.
Figure 36A:
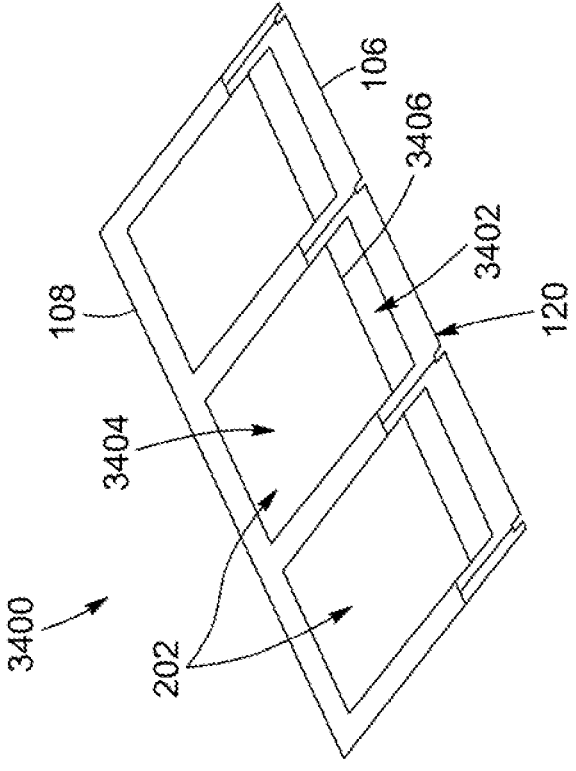
FIG. 36A is a perspective view of a portion of the label assembly of FIG. 34, with labels affixed to the label support liner.

As shown in FIG. 36A, the label assembly (3400) is first provided. As shown in FIG. 36B, the removable liner portion (120) is then separated from the main liner portion (110) and is moved away from the main liner portion (110), similarly to the step of the method illustrated in FIG. 5B. As shown in FIG. 36C, the second label section (3404) is then affixed to the outer container surface (60), in the same manner as shown in FIG. 5C. As further shown in FIG. 360, the removable liner portion (120) can also be removed from the second label section (3404) in the same manner as shown in FIG. 5D, and finally the entire second label section (3404) can be affixed to the outer container surface (60).

In this implementation, when the removable liner portion (120) is removed from the second label section (3404), the first label section (3402) remains on the removable liner portion (120) and is thereby separated from the second label section (3404). The first and second label sections (3402, 3404) can then be used similarly to the first and second label sections (3108, 3110) of the label assembly (3100), as described above.

Figure 38:
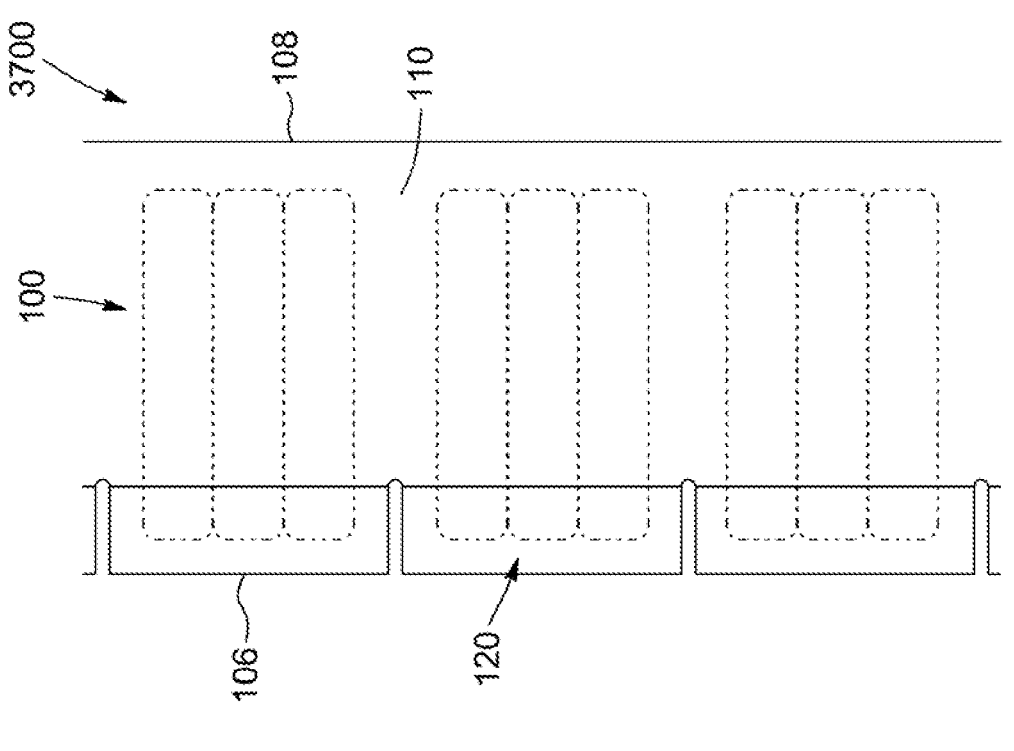
FIG. 38 is a bottom plan view of the label assembly of FIG. 37.
Figure 37:
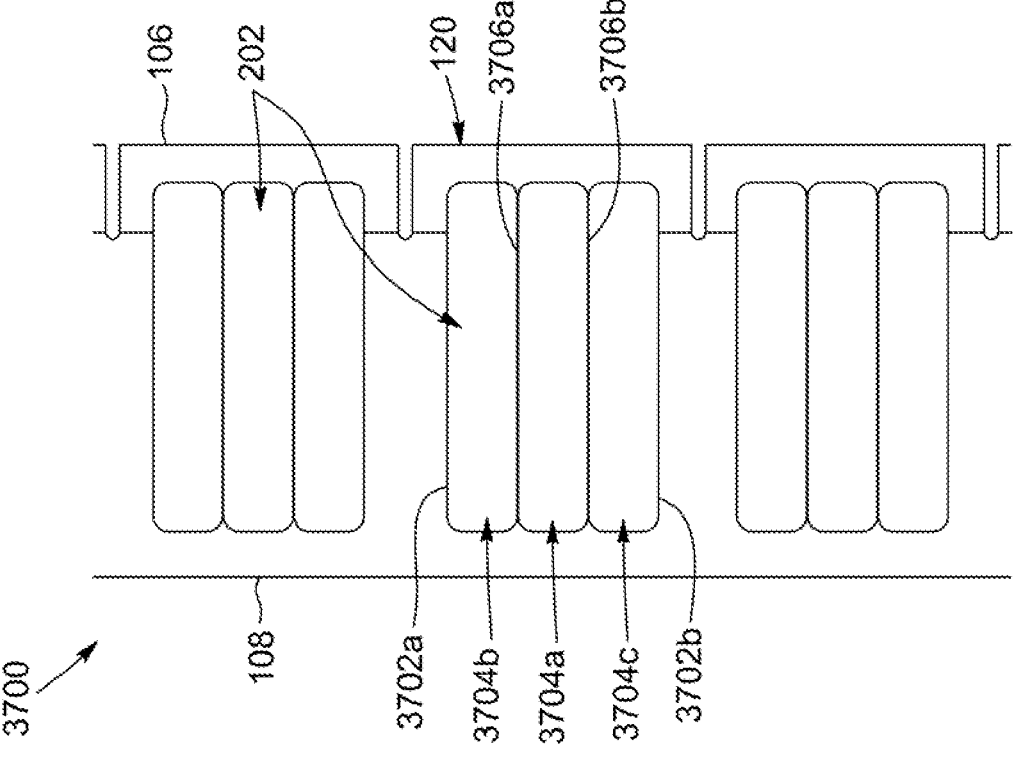
FIG. 37 is a top plan view of a label assembly, in accordance with another implementation.

Referring now to FIGS. 37 and 38, there is shown a label assembly (3700), in accordance with yet another implementation. In this implementation, the labels (202) are spaced from each other and each label (202) extends in a heightwise direction between first and second lateral label edges (3702a, 3702b). In the illustrated implementation, the first and second lateral label edges (3702a, 3702b) extend substantially parallel to each other and substantially perpendicular to the first liner side edge (106), but alternatively, the first and second lateral label edges (3702a, 3702b) could be angled relative to each other and/or relative to the first liner side edge (106).

In this implementation, each label (202) includes a plurality of label sections (3704a, 3704b, 3704c) which each overlap both the main liner portion (110) and the corresponding removable liner portion (120). Specifically, the label (202) includes first and second label cut lines (3706a, 3706b) which are spaced apart from each other and which extend substantially parallel to the first and second lateral label edges (3702a, 3702b) along an entire width of the label (202). According to this configuration, the label cut lines (3706a, 3706b) divide the label (202) into a central label section (3704a) extending between the label cut lines (3706a, 3706b), a first lateral label section (3704b) extending between the first label cut line (3706a) and the first lateral label edge (3702a), and a second lateral label section (3704c) extending between the second label cut line (3706b) and the second lateral label edge (3702b).

In the illustrated implementation, the label sections (3704a, 3704b, 3704c) are substantially elongated and rectangular but alternatively, the label sections (3704a, 3704b, 3704c) could have any other suitable size and shape. Still in the illustrated implementation, all three label sections (3704a, 3704b, 3704c) are similarly sized and shaped but alternatively, the label sections (3704a, 3704b, 3704c) could have different shapes and/or sizes.

It will be understood that since all three label sections (3704a, 3704b, 3704c) overlap the same removable liner portion (120), all three label sections (3704a, 3704b, 3704c) will be peeled off the main liner portion (110) when the removable liner portion (120) is removed from the main liner portion (110). All three label sections (3704a, 3704b, 3704c) could then be affixed to a same surface side-by-side or be individually removed manually from the removable liner portion (120) and affixed to different surfaces.

It will further be understood that the configuration illustrated in FIGS. 37 and 38 in which the label (202) includes three label sections (3704a, 3704b, 3704c) is merely provided as an example, and that any multi-label assembly templates with any number of labels of different sizes, shapes, layouts and configurations are contemplated.

It will also be understood that even when not explicitly mentioned, in all implementations described above, the label assembly may either be provided with a waste portion similar to the waste portion (204) illustrated in FIGS. 1-3 extending adjacent the labels and affixed to the label support liner, or may be provided without any waste portion adjacent the labels. Furthermore, it will be understood that partial removal of the waste portion from certain area(s) and leaving the waste portion on the other part(s) of the assembly is contemplated. For example, the waste portion could be superposed only over the removable liner portion and not over the main liner portion, or vice-versa.

It will further be appreciated that in all of the above configurations, the removable liner portion increases the label's stiffness or rigidity, which may further cause the label (202) to further resist bending more efficiently.

Figures 39, 40:
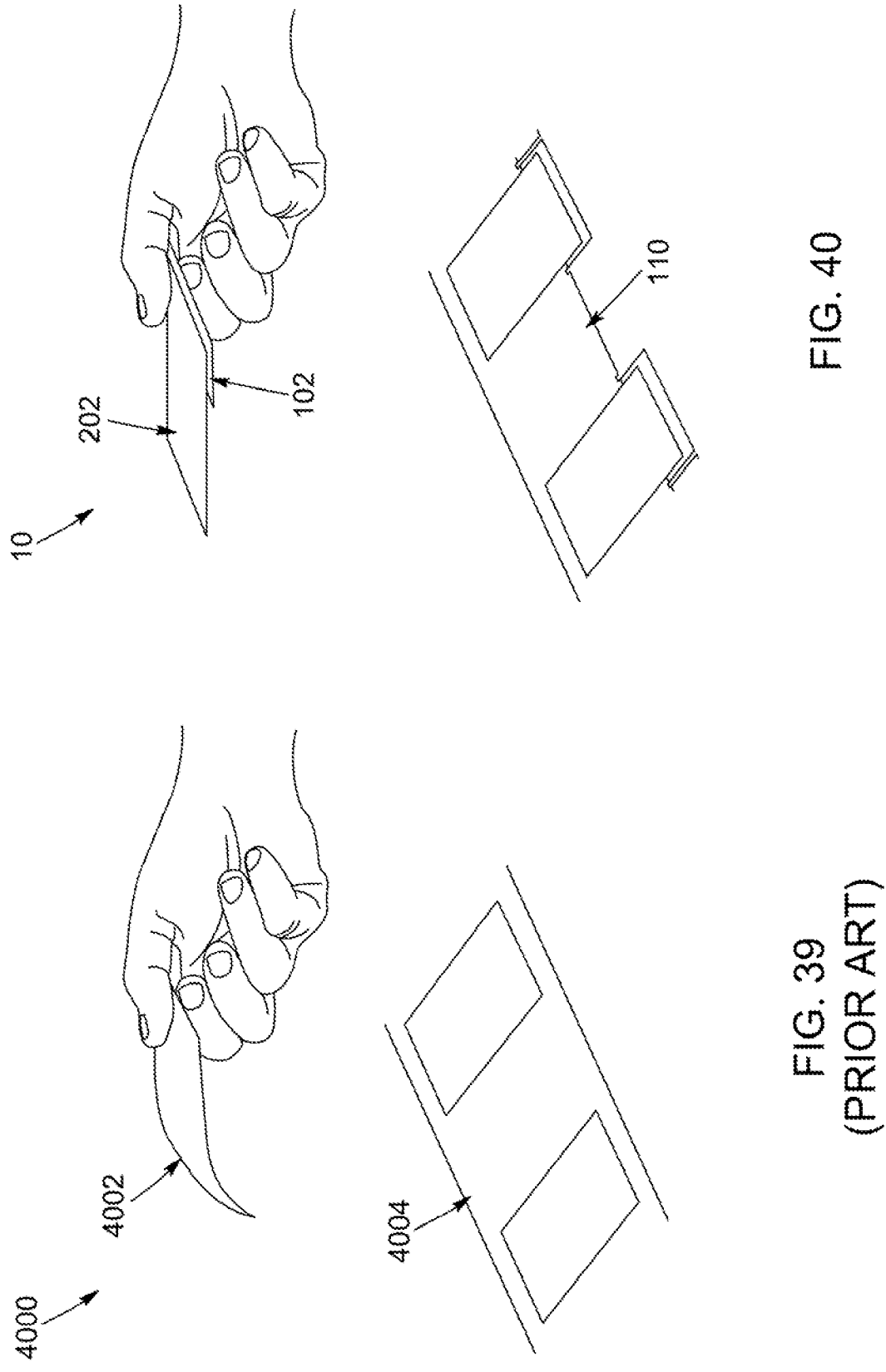
FIG. 39 is a perspective view of a portion of the label assembly of the prior art, showing a user's hand holding a label which has been peeled off from a liner of the label assembly.
FIG. 40 is a perspective view of a portion of the label assembly illustrated in FIG. 1, showing a user's hand holding a label with a corresponding removable liner portion affixed to the label, the label having been peeled off from the main liner portion and the removable liner portion having been separated from the main liner portion.

For example, FIG. 39 shows a label assembly (4000) of the prior art, in which the label assembly (4000) includes a label (4002) which is initially releasably affixed to a liner (4004). The liner (4004) does not include a removable liner portion, such that the user manipulates only the label (4002) when the label (4002) is removed from the liner (4004). As shown in FIG. 39, when removed from the liner (4004), depending on the type of material from which the label (4002) is made and on the dimensions of the label (4002), including a thickness, height and/or width of the label (4002), the label (4002) may be relatively flimsy and when held by a corner as shown in FIG. 39 to be affixed to a surface, the label (4002) may bend about a widthwise axis and/or a heightwise axis. This may impede the user's ability to properly manipulate the label (4002) and affix the label (4002) to the desired surface.

In contrast, FIG. 40 show a label assembly as disclosed herein, and more specifically the label assembly (10) as illustrated in FIGS. 1 to 3, in which the label (202) is removed from the main liner portion (110) and the removable liner portion (120) is affixed to the label (202). In the implementation illustrated in FIG. 40, the label (202) may have substantially the same dimensions and be made of the same material as the label (4002) illustrated in FIG. 40. As shown in FIG. 40, in some circumstances, this configuration may cause the label (202) to present substantially little or no bending, which would facilitate the manipulation and affixing of the label (202) on the desired surface.

Testing was further performed to better appreciate the increase in stiffness provided by the removable liner portion removably affixed to the label. An example of a testing methodology and of test results are provided below, with references to FIGS. 41A to 43.

Example

Stiffness parameters of label assemblies were tested with four different configurations of label assemblies. Each configuration includes different combinations of materials for the label layer and the liner, the materials being four different types of materials which are commonly used for making labels.

The configurations which were tested are described in Table 1 below:

TABLE 1

| Description of samples | | |
|---|---|---|
| Samples | Configuration | Materials used |
| A | Paper facestock with a film liner | Thermal-transfer paper facestock on a 1.5 mil clear polyester film (PET) liner |
| B | Paper facestock with paper liner | Paper facestock with 40 Lb paper liner |
| C | Film facestock with paper liner | 1.6 mil Biaxially Oriented Polypropylene (BOPP) film on a 40 Lb paper liner |
| D | Film facestock with film liner | 0.7 mil clear BOPP on 1 mil clear PET liner |

For sample B, the Spec #54313 product manufactured by Avery Dennison Corporation (Glendale, California, USA) was used. For sample D, the Spec #78804 product manufactured by Avery Dennison Corporation (Glendale, California, USA) was used.

For each configuration, two sets of sample labels were prepared. In both sets, a sample portion of the label measuring 1.5 inches×1.5 inches was cut out of the label assembly. In the first set of samples, the liner was cut along a cut line or backslit on a flexographic diecutting machine to divide the label into a first, smaller liner portion forming the removable liner portion (120) and a second, larger liner portion corresponding to the main liner portion. Specifically, the backslit was located at a distance of 0.5 inches from a side edge of the cut-out portion measured in a machine direction (MD) of the sample, which corresponds to the direction of rolling of the material on a rotary flexographic press. The larger liner portion is then removed to form an exposed underside portion (4300) of the label such that only the removable liner portion (120) remains on the label (202). Accordingly, the removable liner portion has an area of 0.5 inches×1.5 inches while the exposed underside portion has an area of 1.0 inches×1.5 inches.

A comparative second set of samples were prepared. In the second set of samples, the removable liner portion was removed from the label such that the entire adhesive of the label was exposed. The exposed underside portion of the label in this second set of samples therefore has an area of 1.5 inches×1.5 inches.

For both sets of samples, talcum powder was applied to the exposed adhesive area to neutralize the adhesive and avoid it sticking to the equipment during the testing process.

Figure 43:
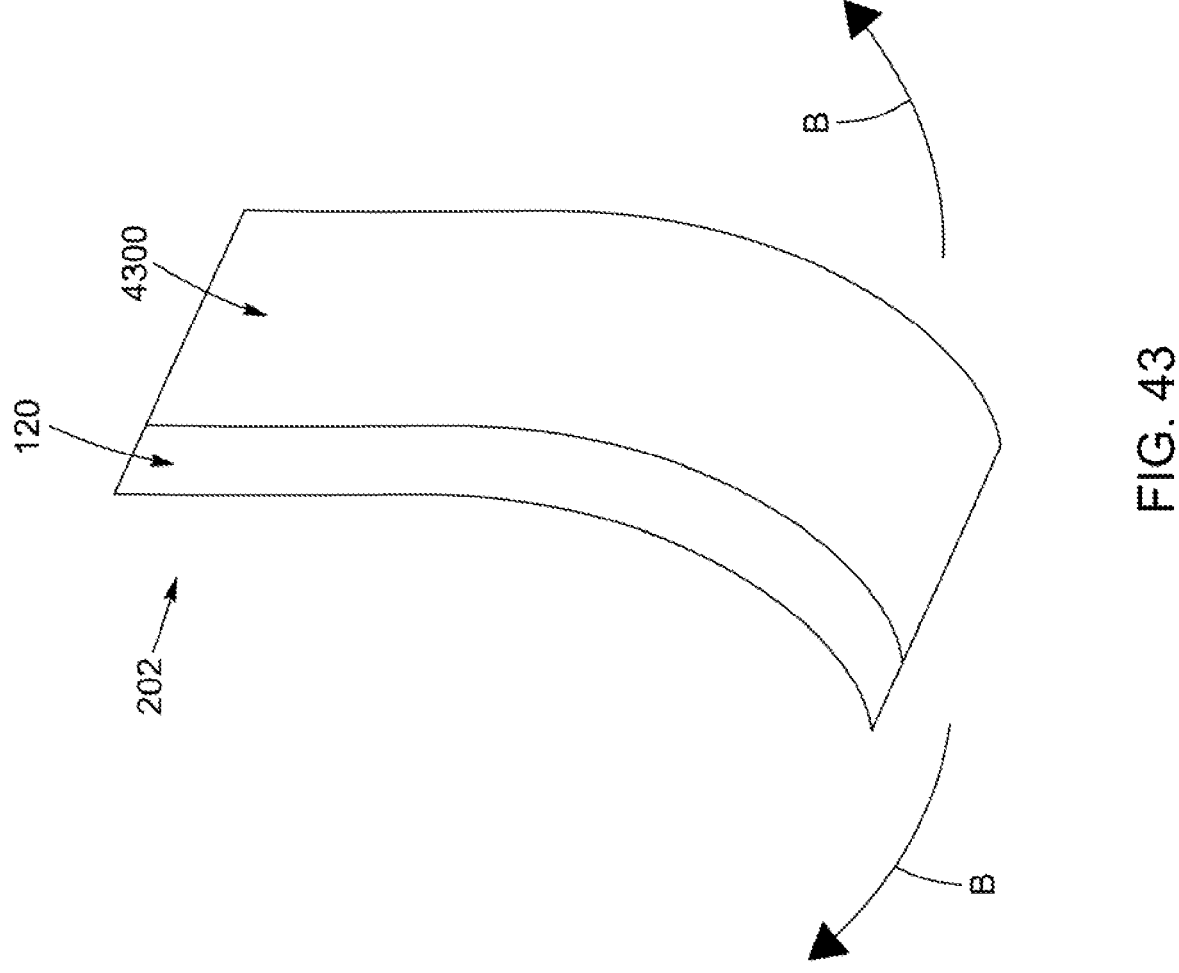
FIG. 43 is a perspective view of a sample of a label assembly for testing a stiffness thereof using the Taber V-5 Stiffness Tester Model 150-E™ illustrated in FIGS. 41A to 428, showing a bending movement direction in which the stiffness of the samples were measured.

The tests were conducted on a stiffness tester (4100), and more particularly a Taber V-5 Stiffness Tester Model 150-E™ manufactured by Taber Industries (North Tonawanda, NY 14120, USA). As shown in FIG. 43, the tests were conducted such that the label (202) was bent in a longitudinal direction of the removable liner portion (120), i.e. in a bending movement illustrated by arrows B in FIG. 43, which coincided with the machine direction (MD) of the material. The samples were tested using the 15° Angle Taber V-5 Stiffness Test, which will be described below, to determine a Taber stiffness of each sample.

Figures 41A, 41B:
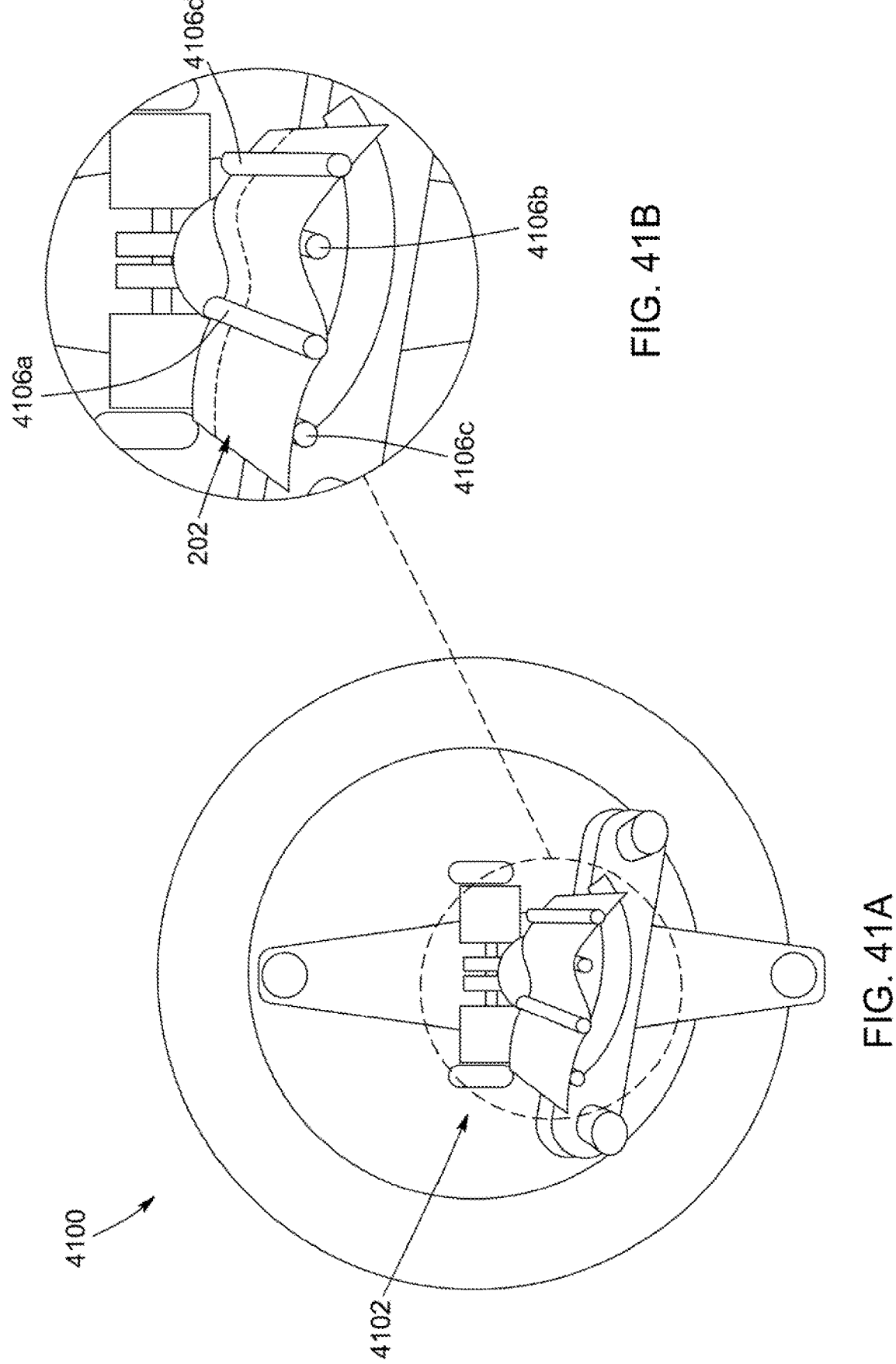
FIG. 41A is a perspective view of a Taber V-5 Stiffness Tester Model 150-E™ with a Range 1 High Sensitivity Attachment and a label of a label assembly mounted therein, in accordance with one implementation, with a removable liner portion affixed to the label.
FIG. 41B is an enlarged view of the Taber V-5 Stiffness Tester Model 150-E™ illustrated in FIG. 41A.

Referring to FIGS. 41A and 41B, the samples C and D were tested using a Range 1 High Sensitivity Attachment™ (4102) mounted to the stiffness tester (4100). The Range 1 High Sensitivity Attachment™ (4102) is configured for testing the most flexible samples, i.e. having Taber Stiffness Unit values between 0-1. The Range 1 High Sensitivity Attachment™ (4102) includes a driven pin holder having first and second holding pins (4106a, 4106b) and a driving pin holder having a third and fourth holding pins (4106c, 4106d). The pins (4106a, 4106b, 4106c, 4106d) are extend substantially parallel to each other. The sample is held between the pins (4106a, 4106b, 4106c, 4106d) during testing of the sample. More specifically, the sample is positioned such that the first and fourth pins (4106a, 4106d) are positioned above the sample and the second and third pins (4106b, 4106c) are position below the sample. The driving pin holder is operatively coupled to an actuator, not shown, and can be rotated relative to the driven pin holder such that the fourth pin (4106d) pushes down on the sample while the third pin (4106c) pushes up on the sample, until the label is deflected to a deflection angle of 15 degrees, at which point the corresponding stiffness value can be determined.

Figures 42A, 42B:
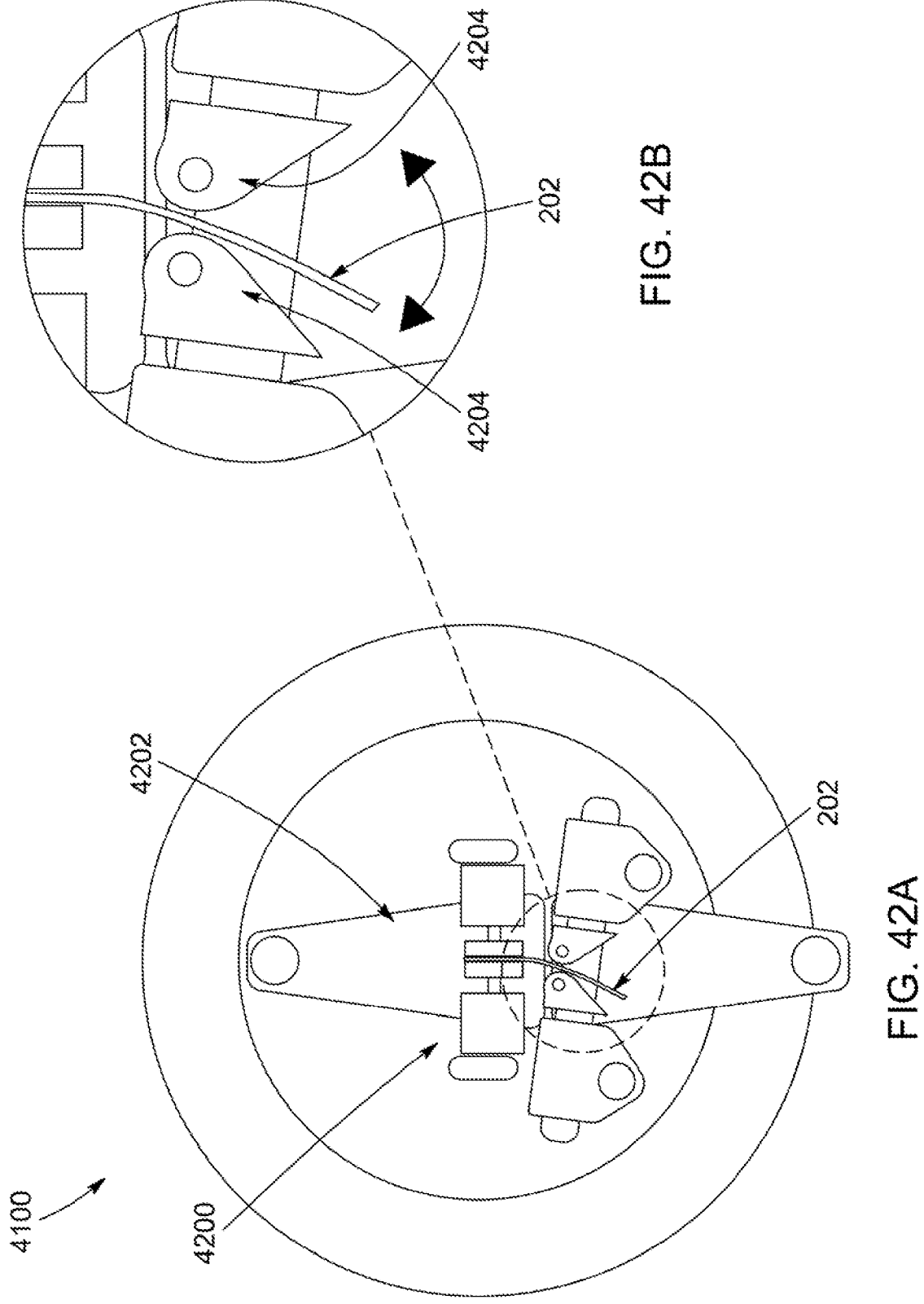
FIG. 42A is a perspective view of a Taber V-5 Stiffness Tester Model 150-E™ in a Range 2 configuration with a label of a label assembly mounted in a clamping system thereof, in accordance with one implementation, with a removable liner portion affixed to the label.
FIG. 42B is an enlarged view e Taber V-5 Stiffness Tester Model 150-E™ illustrated in FIG. 42A.

Referring now to FIGS. 42A and 42B, the samples A and B were tested using a Range 2 methodology which is adapted for measuring Taber Stiffness Unit values between 0 and 10. For this testing, the tester stiffness tester (4100) was set up in a Range 2 configuration in which the samples were set up on the stiffness tester (4100) using a clamping system (4200) located on a pendulum (4202) of the tester (4100). Rollers (4204) positioned on either side of the label are operatively coupled to a driving disc located behind the pendulum (4202). The rollers (4204) are configured to apply a lateral force to a lower end of the label to deflect it from its vertical position in either the left or right direction. As the label deflects further from its original position, the pendulum (4202) applies more torque. The stiffness of the label is measured when a mark of the pendulum (4202) aligns with a mark of the driving disc mark corresponding to a deflection of the label of 15 degrees.

Results of the tests conducted are shown in Table 2 below:

TABLE 2

| | Results | | |
|---|---|---|---|
| Sample # | Taber Stiffness Value, g · cm Label Without Removable Liner Portion | Taber Stiffness Value, g · cm Label Face With Removable Liner Portion | Percentage of Stiffness Increase |
| A | 1.09 | 1.19 | 9.1% |
| B | 1.12 | 1.90 | 69.6% |
| C | 0.050 | 0.47 | 840% |
| D | 0.003 | 0.060 | 1900% |

As shown in Table 2 above, in all cases, an improvement in the stiffness of the label with the removable liner portion secured to the label compared to the label without a removable liner portion was observed.

Although the increase in stiffness for label assemblies having a facestock made of paper (Samples A and B) is already significant between around 9% and 70% it was observed that the increase in stiffness was even more notable for a label assembly having a film facestock with a paper liner (Sample C), i.e. 840%. The greatest increase in stiffness was observed in label assemblies comprising a film facestock and a film liner (Sample D), in which case the assembly with a removable liner portion had a stiffness which was 1900% greater than the stiffness of the same label assembly provided without the removable liner portion.

Based on the test results, it will be appreciated that by maintaining a removable liner portion temporarily affixed to the label when the label is removed from a main liner portion of a liner, a significant increase in the stiffness of the label can be achieved, which can facilitate the peeling, handling, manipulation and affixing of the label to a surface. This increased stiffness due to the removable liner portion is particularly notable for labels with flexible film facestocks, but is observed for all configurations of label assemblies.

It will therefore be appreciated that in at least one implementation, a label assembly may be configured according to one of the implementations described above such that when the removable liner portion is affixed to the label, the label assembly has a first Taber stiffness determined by a 15° angle Taber V-S stiffness test, and when the removable liner portion is removed from the label, the label has a second Taber stiffness determined by a 15° angle Taber V-S stiffness test, the first Taber stiffness being at least 1% greater than the second Taber stiffness. More specifically, there could be provided a label assembly configured according to one of the implementations described above such that the first Taber stiffness is at least 5% greater than the second Taber stiffness. Even more specifically, there could be provided a label assembly configured according to one of the implementations described above such that the first Taber stiffness is at least 10% greater than the second Taber stiffness or, still more specifically, the first Taber stiffness is at least 50% greater than the second Taber stiffness.

It will be understood that the implementations described above are merely provided as examples, and that many various implementations of the label assemblies and/or method could be considered.

For example, in some implementations, there is provided a container labeling kit including a container, such as the container (62) illustrated in FIGS. 5C to 5E, and a label assembly configured as any of the label assemblies described hereinabove, including the label affixable to the outer container surface (60) of the container (62). As explained above, the container may be a specimen container which is adapted for receiving a biological specimen. Alternatively, the container could be any other container containing any other substance or item.

In other implementations, the label assembly could instead be used to label any item, object, product which may or may not have any enclosure for containing a liquid or a matter, e.g. a vial, bottle, IVF straw, microscope slide, histological cassette, a rod, a box, eye-glass, jewelry piece, car part, electronic device, chip-board, electrical part, an appliance, medical device, a plastic bag, a piece of clothing, or any other suitable item. In some implementations, there could be provided a kit containing any of the above-listed items and any of the label assemblies defined hereinabove.

It will be understood that the term "container" as used hereinabove may refer to any item that can either receive, accept, hold or transport something and is not required to have an enclosure. Furthermore, the container can be an object having a flat, curved, cylindrical, slanted or any other type of surface or be of any geometrical shape and configuration. Non-limitative examples of containers include a vial (e.g. laboratory vial), a box (e.g. freezer box, packaging box), a cassette (e.g. histological cassette), a slide (e.g. microscope slide), a plate, a bag (e.g. plastic bag, a blood bag), a tube (e.g. test tube, Vacutainer tube), a tubing, a tire (e.g. automobile tire), a jar, a can, a bottle, a battery (e.g. car battery), a flask, a straw (e.g. IVF straw), a cable, a wire, etc.

In other implementations, the label assembly could be provided in other forms such as in a label printing kit comprising the label assembly and a printing device configured for printing on the label. Any other types of kits comprising the label assembly are contemplated such as kits including the label assembly and at least one of a printing ribbon, a cartridge, ink, a writing instrument, a software, a scanning device, a wireless communication device or component, a container, a microscope slide, an item or object for labelling, an item or object related to labelling or identification, or any other suitable element.

It will also be understood that the term "line" as used hereinabove in connection with the cut lines defined in the support liner, the cut lines defined in the waste portion of the label layer or any other line included in any other disclosed feature is not limited to a straight or linear line and could instead include non-linear lines, curvy lines, double-crossing lines, wavy lines, spiral, zigzag, free-hand lines, symmetrical or non-symmetrical lines, patterned lines, atypical lines, lines incorporating geometrical shapes or lines intermitting with geometrical shapes, hybrid lines, fusion of different types of lines and any combination thereof.

It will further be understood that the shapes illustrated in the accompanying drawings and described above in connection with the labels, with the removable liner portions or with any other feature are merely provided as examples. The term "shape" could refer to any type of shape (e.g. symmetric, asymmetric, atypical shapes, etc.) including but not limited to: triangle, circle, semi-circle, oval, semi-oval, square, rectangle, parallelogram, rhombus, trapezium, asterisk, kite, polygons (e.g. pentagon, hexagon, octagon, nonagon, decagon, etc.), free-hand shapes, arrow-like shapes, hammer-like shapes, hybrid shapes, fusion of two or more of the above shapes or elements thereof, or any combination thereof.

In the present description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Furthermore, in the context of the present description, it will be considered that all elongated objects will have an implicit "longitudinal axis" or "centerline", such as the longitudinal axis of a shaft for example, or the centerline of a biasing device such as a coiled spring, for example, and that expressions such as "connected" and "connectable", "secured" and "securable", "affixed" and "affixable" or "mounted" and "mountable", may be interchangeable, in that the present label assembly also relates to kits with corresponding components for assembling a resulting fully-assembled and fully-operational label assembly.

Moreover, components of the present label assembly and/or steps of the method(s) described herein could be modified, simplified, altered, omitted and/or interchanged, without departing from the scope of the present disclosure, depending on the particular applications which the present label assembly is intended for, and the desired end results, as briefly exemplified herein and as also apparent to a person skilled in the art.

In addition, although the embodiments as illustrated in the accompanying drawings comprise various components, and although the embodiments of the present label assembly and corresponding portion(s)/part(s)/component(s) as shown consist of certain geometrical configurations, as explained and illustrated herein, not all of these components and geometries are essential and thus should not be taken in their restrictive sense, i.e. should not be taken so as to limit the scope of the present disclosure. It is to be understood, as also apparent to a person skilled in the art, that other suitable components and cooperation thereinbetween, as well as other suitable geometrical configurations may be used for the present label assembly and corresponding portion(s)/part(s)/component(s) according to the present label assembly, as will be briefly explained herein and as can be easily inferred herefrom by a person skilled in the art, without departing from the scope of the present disclosure.

In the above description, an embodiment is an example or implementation of the inventions. The various appearances of "one implementation," "an implementation" or "some implementations" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the terms "including", "comprising", "consisting" and grammatical variants thereof do not preclude the addition of one or more components, features, steps, or integers or groups thereof and that the terms are to be construed as specifying components, features, steps or integers.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. The present invention may be implemented in the testing or practice with methods and materials equivalent or similar to those described herein.

Although the present invention has been described hereinabove by way of specific embodiments thereof, it can be modified, without departing from the spirit and nature of the subject invention defined in the appended claims.

The invention claimed is:

1. A label assembly comprising:

a label support liner having a label receiving surface comprising a release coating, the label support liner including a main liner portion and a plurality of removable liner portions, each one of the plurality of removable liner portions being individually separable from the main liner portion, the label support liner including a liner side edge, the plurality of removable liner portions each delimited by a liner cut line extending from the liner side edge in a direction transverse to the liner side edge; and a label layer extending over the label receiving surface, the label layer including:

a plurality of labels releasably affixed to the label receiving surface and arranged in a single column aligned with the liner side edge, each label including a first label portion overlapping the main liner portion and a second label portion overlapping a corresponding one of the removable liner portions such that separating the corresponding one of the removable liner portions from the main liner portion and from the other ones of the removable liner portions and moving the corresponding one of the removable liner portions away from the label receiving surface peels the first label portion away from the main liner portion while the second label portion remains affixed to the corresponding one of the removable liner portions wherein any one of the removable liner portions is removable one at a time to expose the second label portion of a respective individual one label of the plurality of the labels.

2. The label assembly as claimed in claim 1, wherein the removable liner portions include first and second removable liner portions positioned such that at least one of the labels overlapping the first and second removable liner portions and the main liner portion.

3. The label assembly as claimed in claim 2, wherein the at least one of the labels defines a first label, the plurality of labels including a second label located proximal to the first label, the second label overlapping the second removable liner portion and the main liner portion.

4. The label assembly as claimed in claim 1, wherein once removed from the label support liner, each label includes a first stiffness section having a first stiffness and a second stiffness section having a second stiffness different from the first stiffness.

5. The label assembly as claimed in claim 4, wherein the first stiffness section includes the first label portion and the second stiffness section includes the second label portion affixed to the removable liner portion, the second stiffness being greater than the first stiffness.

6. The label assembly as claimed in claim 1, wherein the liner includes at least one label position indicator, each label position indicator providing an indication relative to a position of a corresponding one of the labels on the liner.

7. The label assembly as claimed in claim 6, wherein each label position indicator includes a printed marking defined on a bottom liner face of the liner opposite the label receiving surface.

8. The label assembly as claimed in claim 1, wherein each label includes a plurality of label sections separable from each other.

9. The label assembly as claimed in claim 8, wherein each one of the plurality of label sections overlaps both the main liner portion and the corresponding one of the removable liner portions.

10. The label assembly as claimed in claim 8, wherein the plurality of label sections includes a first label section located towards the corresponding one of the removable liner portions and a second label section located towards the main liner portion, the first and second label sections being separable from each other.

11. The label assembly as claimed in claim 10, wherein each label includes a label tear line extending between the first and second label sections.

12. The label assembly as claimed in claim 10, wherein the first label section is superposed only over the removable liner portion and the second label section overlaps the removable liner portion and the main liner portion.

13. The label assembly as claimed in claim 10, wherein the first label section overlaps the removable liner portion and the main liner portion, and the second label section is superposed only over the main liner portion.

14. The label assembly as claimed in claim 1, wherein at least some of the removable liner portions are located adjacent the liner side edge.

15. The label assembly as claimed in claim 14, wherein each liner cut line includes a first cut line end located towards the liner side edge and a second cut line located towards the liner side edge and spaced apart from the first cut line end along the liner side edge.

16. The label assembly as claimed in claim 15, wherein the liner cut line includes first and second linear cut line portions extending away from the liner side edge and a third linear cut line portion extending between the first and second linear cut line portions.

17. The label assembly as claimed in claim 16, wherein the third linear cut portion is substantially parallel to the liner side edge.

18. The label assembly as claimed in claim 16, wherein each one of the first and second linear cut line portions includes a notch.

19. The label assembly as claimed in claim 18, wherein each notch has a pair of parallel linear edges spaced apart from each other to define a gap therebetween.

20. The label assembly as claimed in claim 15, wherein the label layer further includes a non-label portion affixed to the label receiving surface and disposed adjacent the plurality of labels.

21. The label assembly as claimed in claim 20, wherein the plurality of labels and the non-label portion together cover an entire surface area of the label receiving surface.

22. The label assembly as claimed in claim 20, wherein the plurality of labels include a first label and a second label disposed side-by-side with the first label.

23. The label assembly as claimed in claim 22, wherein the first and second labels are contiguous to each other.

24. The label assembly as claimed in claim 22, wherein the first and second labels are spaced from each other.

25. The label assembly as claimed in claim 24, wherein the non-label portion includes a non-label cut line extending between the first and second labels, the non-label cut line being aligned with a corresponding one of the liner cut lines to divide the non-label portion into a non-label removable section superposed over the removable liner portion and a non-label main section superposed over the main liner section.

26. The label assembly as claimed in claim 24, further including a tear line extending between the first and second labels.

27. A method for affixing a label to a surface, the method including:
   providing the label assembly of claim 1;
   separating one of the removable liner portions from the main liner portion with the second label portion of a corresponding one of the labels remaining affixed to the removable liner portion;
   moving the removable liner portion away from the label receiving surface on the main liner portion to peel the first label portion of the corresponding one of the labels from the main liner portion; and
   affixing the first label portion of the label on the surface.

28. The method as claimed in claim 27, further comprising, after affixing the first label portion of the label on the surface:
   removing the removable liner portion from the second label portion; and
   affixing the second label portion of the label on the surface.

29. A container labeling kit comprising:

a container having an outer container surface; and a label assembly for labeling the container, the label assembly comprising:

a label support liner having a label receiving surface comprising a release coating, the label support liner including a main liner portion and a plurality of removable liner portions, each one of the plurality of removable liner portions being individually separable from the main liner portion, the label support liner including a liner side edge, the plurality of removable liner portions each delimited by a liner cut line extending from the liner side edge in a direction transverse to the liner side edge; and a label layer extending over the label receiving surface, the label layer including:

a plurality of labels releasably affixed to the label receiving surface and arranged in a single column aligned with the liner side edge, each label including a first label portion overlapping the main liner portion and a second label portion overlapping a corresponding one of the removable liner portions such that separating the corresponding one of the removable liner portions from the main liner portion and from the other ones of the removable liner portions and moving the corresponding one of the removable liner portions away from the label receiving surface peels the first label portion away from the main liner portion while the second label portion remains affixed to the corresponding one of the removable liner portions wherein any one of the removable liner portions is removable one at a time to expose the second label portion of a respective individual one label of the plurality of the labels.

30. The container labeling kit as claimed in claim 29, wherein the container is a specimen container for receiving one of a medical specimen and a biological specimen.

\* \* \* \* \*